(12) United States Patent
Nakamura et al.

(10) Patent No.: US 11,165,674 B2
(45) Date of Patent: Nov. 2, 2021

(54) ABNORMALITY NOTIFICATION SYSTEM, ABNORMALITY NOTIFICATION METHOD, AND ABNORMALITY NOTIFYING DEVICE

(71) Applicant: FUJITSU LIMITED, Kawasaki (JP)

(72) Inventors: Yosuke Nakamura, Kawasaki (JP); Kazuaki Nimura, Kawasaki (JP); Tatsuro Matsumoto, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 40 days.

(21) Appl. No.: 16/420,247

(22) Filed: May 23, 2019

(65) Prior Publication Data
US 2019/0386898 A1    Dec. 19, 2019

(30) Foreign Application Priority Data
Jun. 19, 2018 (JP) .............................. JP2018-115901

(51) Int. Cl.
*H04W 4/80* (2018.01)
*H04L 29/06* (2006.01)
*H04W 84/18* (2009.01)
*H04L 12/26* (2006.01)

(52) U.S. Cl.
CPC ........ *H04L 43/062* (2013.01); *H04L 63/1425* (2013.01); *H04W 4/80* (2018.02); *H04W 84/18* (2013.01)

(58) Field of Classification Search
CPC .... H04L 43/062; H04L 63/1425; H04W 4/80; H04W 84/18
USPC .......................................................... 709/224
See application file for complete search history.

(56) References Cited

U.S. PATENT DOCUMENTS

| 5,627,766 | A | * | 5/1997 | Beaven | ............... | G06F 11/0715 370/241 |
| 9,973,893 | B2 | * | 5/2018 | Evans | .................... | H04W 4/023 |
| 10,511,477 | B2 | * | 12/2019 | Luo | ........................ | H04W 76/28 |
| 2004/0174259 | A1 | * | 9/2004 | Peel | ........................ | G07C 5/008 340/539.26 |
| 2017/0228508 | A1 | * | 8/2017 | Cook | ...................... | G06F 19/00 |
| 2020/0241575 | A1 | * | 7/2020 | Meisenholder | ......... | G05D 1/102 |

FOREIGN PATENT DOCUMENTS

| JP | 2006-295425 | 10/2006 |
| JP | 2016-076812 | 5/2016 |

* cited by examiner

*Primary Examiner* — Kevin T Bates
*Assistant Examiner* — Chen-Liang Huang
(74) *Attorney, Agent, or Firm* — Fujitsu Patent Center

(57) ABSTRACT

An abnormality notification system includes a plurality of relay apparatuses that form a first ad-hoc network and communicate with other relay apparatuses, and a plurality of abnormality notification apparatuses attached to respective relay apparatuses. The abnormality notification apparatus forms a second ad-hoc network with another abnormality notifying apparatus attached to another relay apparatus, and notifies, when detecting an abnormality of the relay apparatus to which the abnormality notifying apparatus is attached, an abnormality notification indicating the abnormality via the second ad-hoc network to the other abnormality notifying apparatus attached to the other relay apparatus.

6 Claims, 20 Drawing Sheets

FIG. 3

| SIGNAL ID | ABNORMALITY DETECTION RELAY DEVICE | ABNORMAL LOCATION |
|---|---|---|
| 01 | 0002 | COMMUNICATION DEVICE |

| SIGNAL ID | ABNORMALITY DETECTION RELAY DEVICE | ABNORMAL LOCATION | PREVIOUS SOURCE | SOURCE |
|---|---|---|---|---|
| 03 | A | COMMUNICATION DEVICE | A | B |

| SIGNAL ID | ABNORMALITY DETECTION RELAY DEVICE | ABNORMAL LOCATION | PREVIOUS SOURCE | SOURCE | TRANSFER FLAG |
|---|---|---|---|---|---|
| 05 | A | COMMUNICATION DEVICE | A | B | ON/OFF |

| SIGNAL ID | SOURCE | TARGET DESTINATION |
|---|---|---|
| 06 | 0100 | D |

| SIGNAL ID | SOURCE | TARGET DESTINATION |
|---|---|---|
| 07 | D | 0100 |

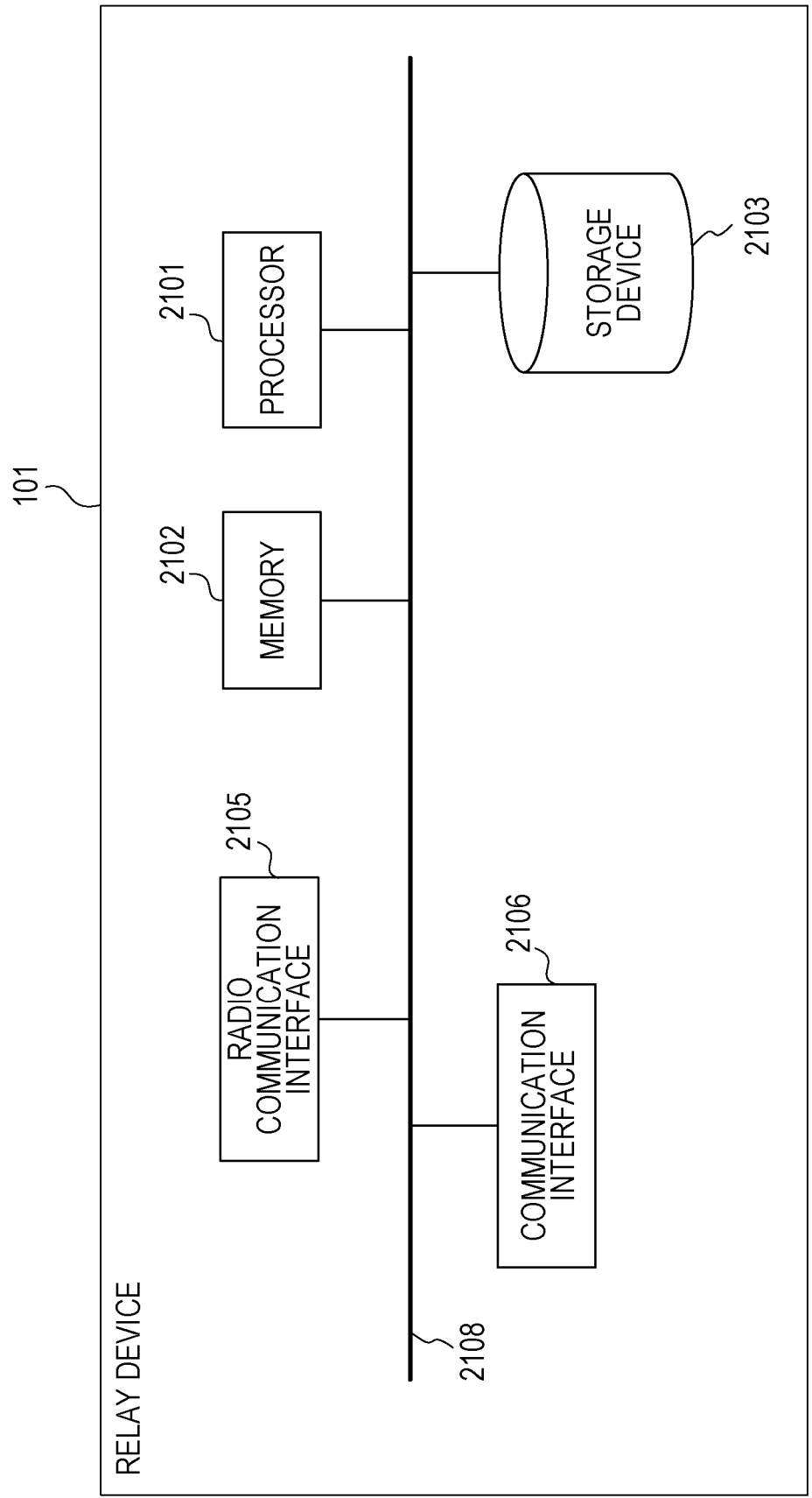

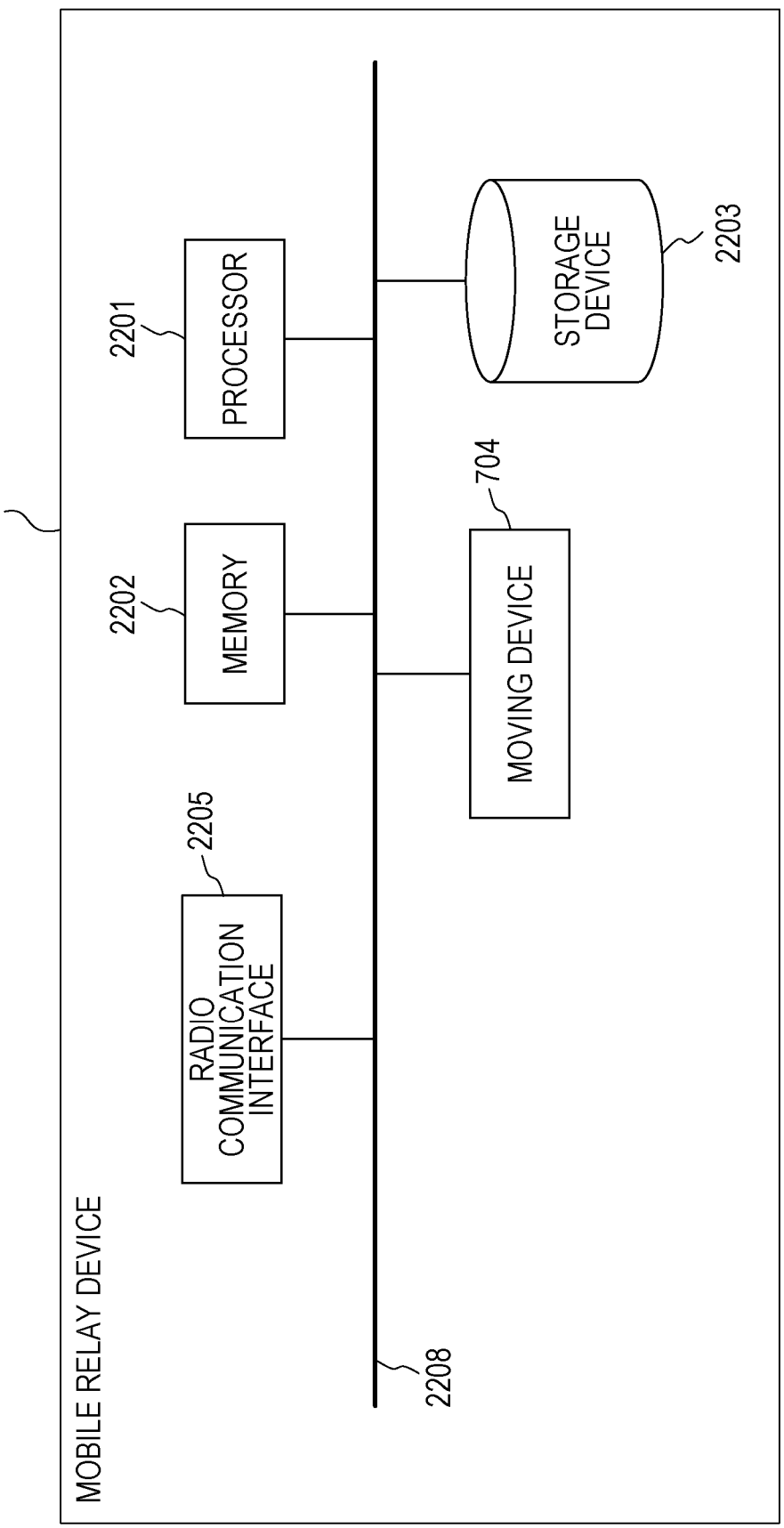

ABNORMALITY NOTIFICATION SYSTEM, ABNORMALITY NOTIFICATION METHOD, AND ABNORMALITY NOTIFYING DEVICE

CROSS-REFERENCE TO RELATED APPLICATION

This application is based upon and claims the benefit of priority of the prior Japanese Patent Application No. 2018-115901, filed on Jun. 19, 2018, the entire contents of which are incorporated herein by reference.

FIELD

The embodiments discussed herein are related to an abnormality notification system, an abnormality notification method, and an abnormality notifying device.

BACKGROUND

An Internet-of-Things (IoT) solution that causes a sensing device worn by a person to collect and analyze data on the person and is used for state watching, labor management, or the like to support the person. Many of such sensing devices are not directly connected to the Internet. In this case, near-field communication such as Bluetooth Low Energy (BLE) of Bluetooth (registered trademark) is used and information is collected via a relay device such as a gateway (GW) for relaying communication with a cloud.

For example, to deploy the IoT solution at a location such as the inside of a tunnel where the Internet is not connected, multiple relay devices are installed, peer-to-peer communication is used, and an ad-hoc network is formed for communication. In this case, for example, data is finally collected by a relay device that communicates with a cloud via multiple relay devices in ad-hoc communication. Connecting all the relay devices to the Internet is costly. Thus, an ad-hoc network is formed to reduce the number of relay devices to be connected to the Internet and reduce the cost in some cases. Examples of related art are Japanese Laid-open Patent Publication No. 2006-295425 and Japanese Laid-open Patent Publication No. 2016-076812.

In such an ad-hoc network, for example, information may not be acquired from a certain sensing device or an abnormality may occur in communication. In this case, a person may be dispatched to perform a task of checking devices one by one in order to identify an abnormal location, and it may take effort and cost money. Thus, a technique for easily identifying an abnormal location has been requested.

SUMMARY

According to an aspect of the embodiments, an abnormality notification system includes a plurality of relay devices that form a first ad-hoc network and communicates with other relay devices, and a plurality of abnormality notification devices attached to respective relay devices. The abnormality notification device forms a second ad-hoc network with another abnormality notifying device attached to another relay device, and notifies, when detecting an abnormality of the relay device to which the abnormality notifying device is attached, an abnormality notification indicating the abnormality via the second ad-hoc network to the other abnormality notifying device attached to the other relay device The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram exemplifying an abnormality notification according to a first embodiment;

FIG. 10 is a diagram exemplifying an abnormality notification according to the second embodiment;

FIG. 13 is a diagram exemplifying an abnormality notification according to a third embodiment;

FIGS. 14A and 14B are diagrams exemplifying a reception completion notification and a reception completion response according to the third embodiment;

FIG. 21 is a diagram exemplifying a hardware configuration that enables each of relay devices according to the embodiments; and FIG. 22 is a diagram exemplifying a hardware configuration that enables the mobile relay device according to the second and third embodiments.

DESCRIPTION OF EMBODIMENTS

Hereinafter, some embodiments are described in detail with reference to the accompanying drawings. An element corresponding to multiple drawings is indicated by the same reference symbol.

Figure 1:
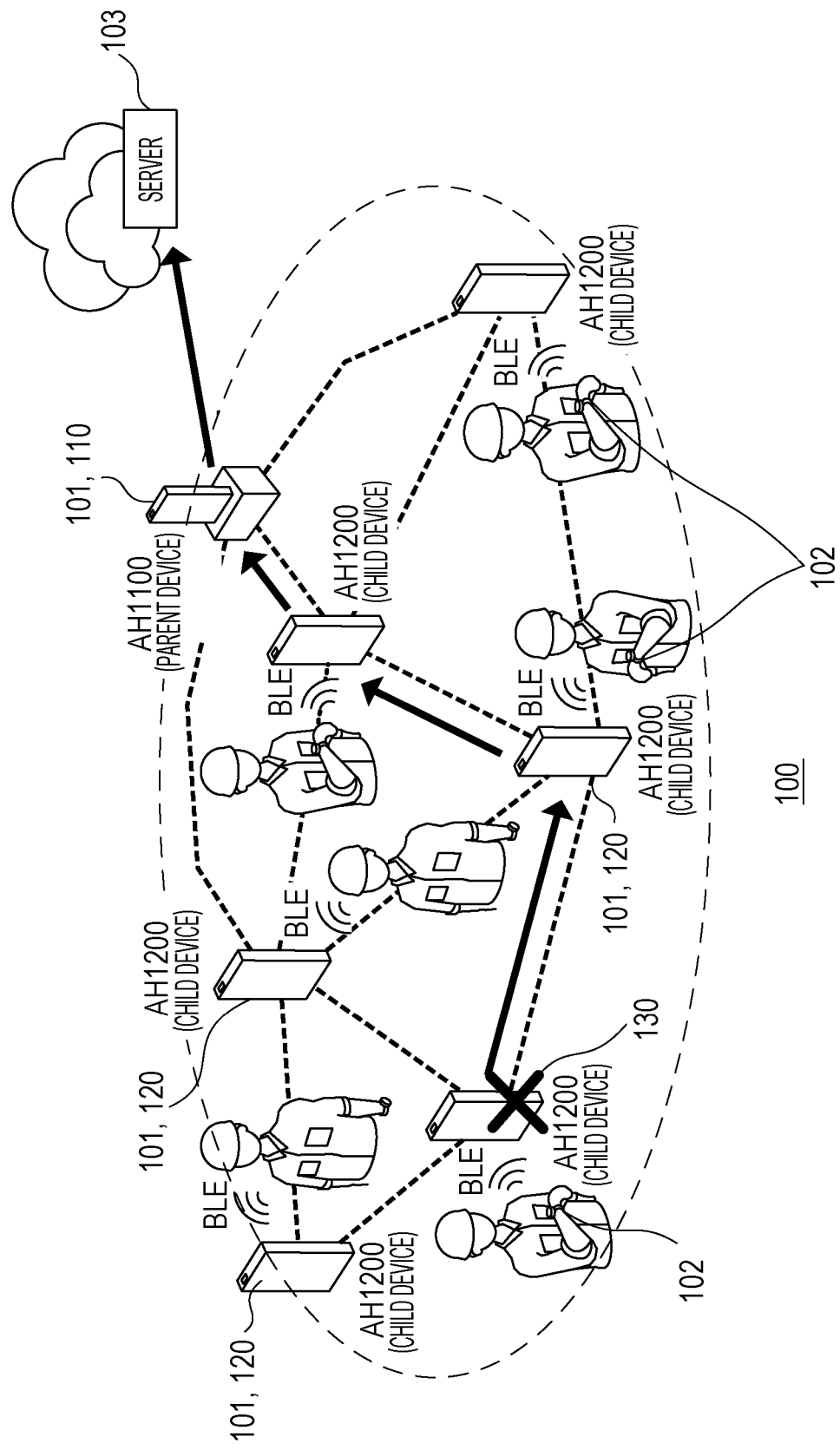
FIG. 1 is a diagram illustrating an exemplary abnormality notification system.

FIG. 1 is a diagram illustrating an exemplary abnormality notification system 100. In an example illustrated in FIG. 1, the abnormality notification system 100 includes a plurality of relay devices 101. The relay devices 101 may be gateways, for example. Each of the relay devices 101 forms an ad-hoc network with the other relay devices 101. In the ad-hoc network, communication devices 102 such as wearable devices worn by workers exist. Each of the relay devices 101 collects, from a communication device 102 existing in a communication range of the relay device 101, information detected by a sensor included in the communication device 102.

A relay device 101 operating as a parent device 110 in the ad-hoc network may communicate with a server 103 on a cloud and the like via, for example, a mobile phone communication network. The parent device 110 may collect, from the other relay devices 101 operating as child devices 120 belonging to the ad-hoc network, information detected by sensors included in the communication devices 102, and transmit the collected information to the server 103 on the cloud. The collected information detected by the sensors of the communication devices 102 may be used for, for example, the watching of the states of persons wearing the communication devices 102, labor management, or the like.

However, for example, information from a certain communication device 102 may not reach the server 103 or a certain abnormality may occur in communication. In this case, to identify an abnormal location, for example, a person may be dispatched to check relay devices 101 and communication devices 102 one by one, and it may take effort and cost money. Thus, a technique for easily identifying the abnormal location has been requested.

It is assumed that a single communication device 102 is connected to a relay device 101 in the ad-hoc network and that an abnormality 130 occurs in the relay device 101. In this case, the server 103 may not determine whether the abnormality 130 has occurred in the relay device 101 or in the communication device 102. Thus, a technique for determining whether the abnormality 130 has occurred in the relay device 101 or in the communication device 102 has been requested to be provided.

Figure 2:
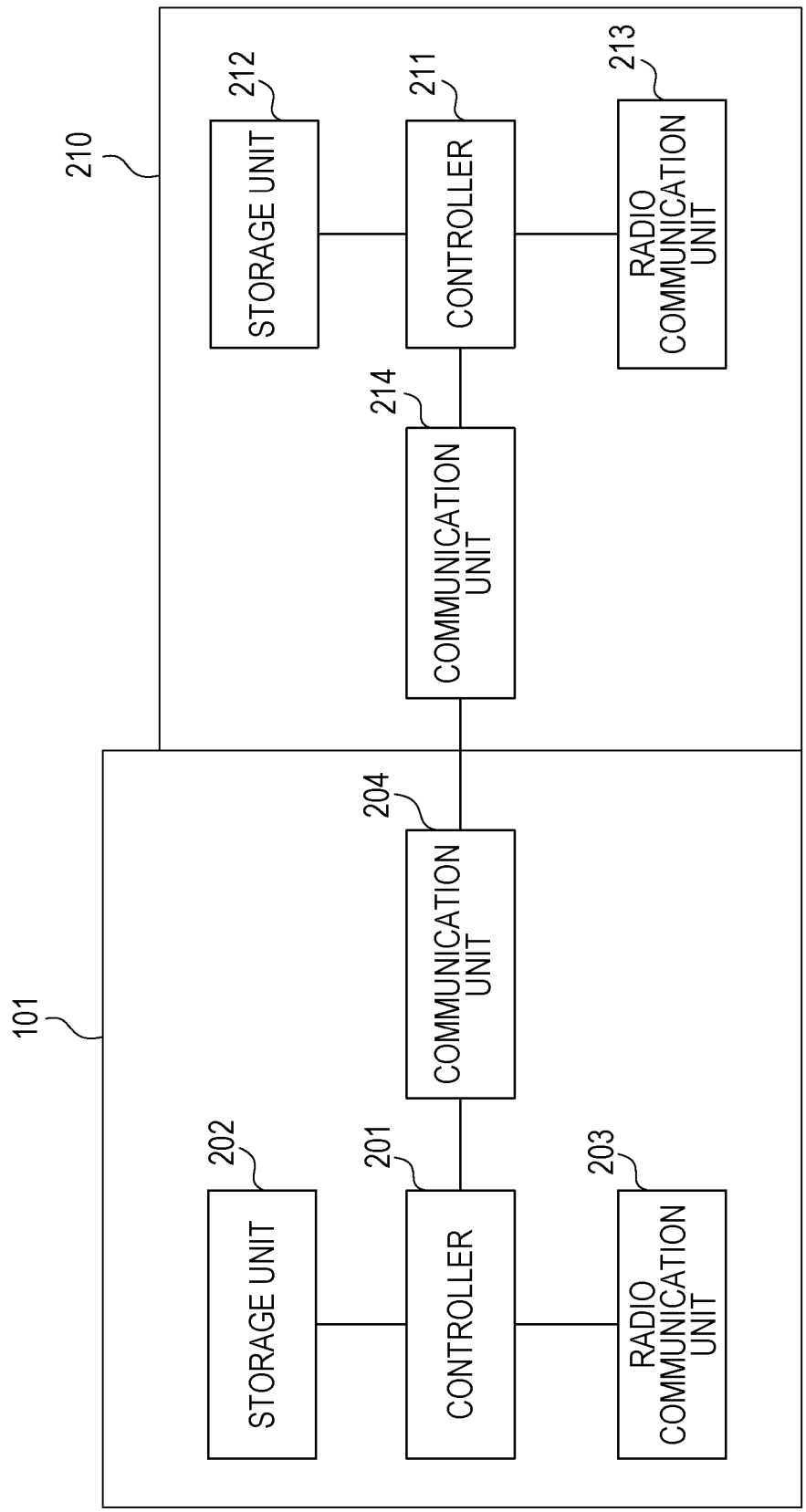
FIG. 2 is a diagram exemplifying a block configuration of a relay device with an abnormality notifying device according to embodiments.

In the embodiments, each of the relay devices 101 has an abnormality notifying device 210 (illustrated in FIG. 2). FIG. 2 is a diagram exemplifying a block configuration of a relay device 101 with an abnormality notifying device 210 according to the embodiments. In an example illustrated in FIG. 2, with reference to FIG. 1, the relay device 101 includes a controller 201, a storage unit 202, a radio communication unit 203, and a communication unit 204. The controller 201 controls the units of the relay device 101. The storage unit 202 may store information and a program for collecting information from a communication device 102 and transmitting the collected information to the server 103. The radio communication unit 203 uses, for example, near-field communication such as BLE or Wi-Fi (registered trademark) to communicate with the communication device 102 and another relay device 101. The radio communication unit 203 forms a first ad-hoc network by communicating with the other relay devices 101. When the relay device 101 is the parent device 110, the radio communication unit 203 may communicate with the server 103 on the cloud via the mobile phone communication network or the like.

As illustrated in FIG. 2, the relay device 101 is connectable to the abnormality notifying device 210 via the communication unit 204 such as a Universal Serial Bus (USB) dongle.

The abnormality notifying device 210 includes a controller 211, a storage unit 212, a radio communication unit 213, and a communication unit 214, for example. The controller 211 controls the units of the abnormality notifying device 210, for example. The storage unit 212 may store information (for example, an identifier identifying the concerned abnormality notifying device 210) and a program in which operations of operational flows described later are described, for example. The radio communication unit 213 may use, for example, near-field communication such as BLE or Wi-Fi (registered trademark) to communicate with the other abnormality notifying devices 210 attached to the other relay devices 101 and form a second ad-hoc network. The radio communication unit 213 may use, for example, near-field communication such as BLE or Wi-Fi (registered trademark) to communicate with a communication device 102. When the relay device 101 having the abnormality notifying device 210 is the parent device 110, the radio communication unit 213 may communicate with the server 103 on the cloud via the mobile phone communication network or the like.

The controller 211 communicates with the relay device 101 via the communication unit 214 and detects an abnormality of communication of the relay device 101 with a communication device 102 and an abnormality of communication of the relay device 101 with another relay device 101, for example. When the controller 211 detects an abnormality of communication of the relay device 101, the controller 211 uses the radio communication unit 213 to communicate with an abnormality notifying device 210 connected to another relay device 101 and transmits information indicating the abnormality to the server 103.

As described above, the relay device 101 has the abnormality notifying device 210 for notifying an abnormality and notifies an abnormality to the server 103 via the second ad-hoc network formed by the abnormality notifying devices 210 and different from the first ad-hoc network formed by the relay devices 101. Thus, even when an abnormality occurs in the relay device 101, the relay device 101 may notify the abnormality to the server 103.

When the abnormality notifying device 210 does not receive a response from the relay device 101 in communication with the relay device 101 having the abnormality notifying device 210 via the communication unit 214, the controller 211 of the abnormality notifying device 210 may detect an abnormality of the relay device 101. When the controller 201 of the relay device 101 does not detect a communication device 102 connected to the relay device 101, the controller 211 of the relay device 101 may notify an abnormality of the communication device 102 to the abnormality notifying device 210. Alternatively, when the controller 201 of the relay device 101 does not detect a communication device 102 connected to the relay device 101, the relay device 101 communicates with a peripheral relay device 101, and the peripheral relay device 101 does not detect the communication device 102, the controller 201 may notify an abnormality of the communication device 102 to the abnormality notifying device 210. When the controller 201 of the relay device 101 detects an abnormality of the radio communication unit 203, the controller 201 may notify the abnormality of the relay device 101 to the abnormality notifying device 210.

When the controller 211 of the abnormality notifying device 210 detects an abnormality of the communication device 102 or of the relay device 101, the controller 211 notifies the abnormality to the server 103 via another abnormality notifying device 210.

An abnormality notification process to be executed by the abnormality notification system 100 according to the first embodiment is described with reference to FIGS. 1 to 6.

First Embodiment

FIG. 3 is a diagram exemplifying an abnormality notification 300 according to the first embodiment. The abnormality notification 300 is information to be transmitted by an abnormality notifying device 210 to notify an abnormality to the server 103. The abnormality notification 300 includes a signal identifier (ID), an abnormality detection relay device, and an abnormal location, for example. The signal ID is, for example, an identifier indicating the type of a signal to be transmitted by the abnormality notifying device 210. The abnormality detection relay device may be information identifying a relay device 101 from which an abnormality has been detected, for example. The abnormal location is information indicating whether the detected abnormality has occurred in the relay device 101 or in a communication device 102, for example. When the detected abnormality has occurred in the communication device 102, an identifier identifying the communication device 102 may be registered in the abnormal location.

Figure 4:
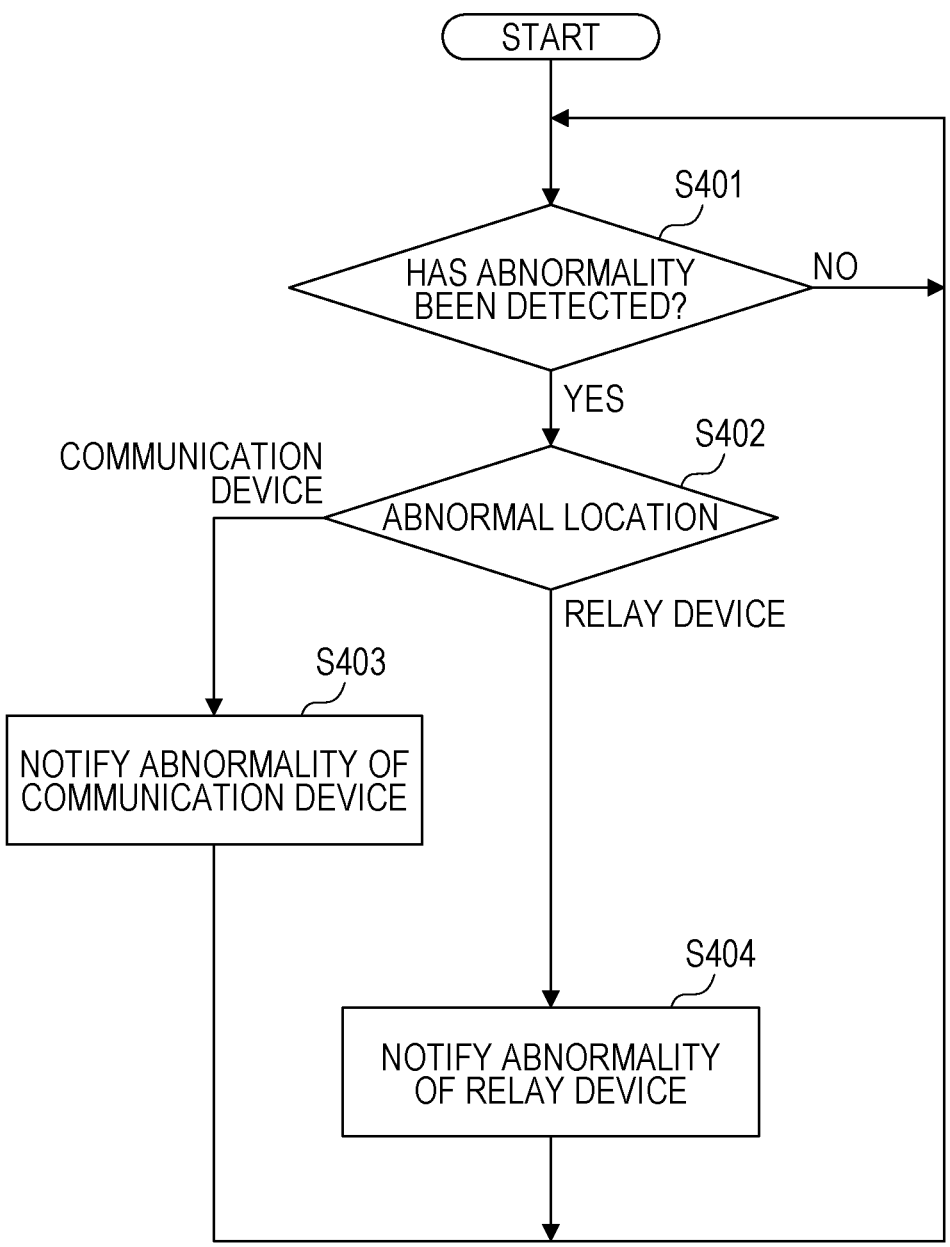
FIG. 4 is a diagram exemplifying an operational flow of an abnormality notification process according to the embodiments.

FIG. 4 is a diagram exemplifying an operational flow of the abnormality notification process according to the first embodiment. When a relay device 101 having an abnormality notifying device 210 is activated, the controller 211 of the abnormality notifying device 210 may start the operational flow illustrated in FIG. 4, for example.

In step 401 (hereinafter, step is abbreviated to "S" and, for example, step 401 is represented by S401), the controller 211 of the abnormality notifying device 210 determines whether an abnormality has been detected from the relay device 101 having the abnormality notifying device 210. For example, when the abnormality notifying device 210 does not receive a response from the relay device 101 in communication between the abnormality notifying device 210 and the relay device 101, the abnormality notifying device 210 may detect an abnormality of the relay device 101. Alternatively, for example, when the controller 211 of the abnormality notifying device 210 receives a notification indicating an abnormality from the relay device 101, the controller 211 of the abnormality notifying device 210 may detect the abnormality of the relay device 101. For example, when the controller 201 of the relay device 101 detects an abnormality of communication between the relay device 101 and another relay device 101 or a communication device 102 via the radio communication unit 203, or when the controller 201 of the relay device 101 does not detect the communication device 102 connected to the relay device 101, the controller 201 of the relay device 101 may transmit a notification indicating the abnormality to the abnormality notifying device 210. Alternatively, when the relay device 101 does not detect the communication device 102 connected to the relay device 101 and communicates with a peripheral relay device 101, and the peripheral relay device 101 does not detect the communication device 102, the relay device 101 may transmit a notification indicating an abnormality to the abnormality notifying device 210. In this case, the controller 211 of the abnormality notifying device 210 may detect the abnormality of the relay device 101 based on the notification indicating the abnormality and received from the relay device 101. When the abnormality of the relay device 101 having the abnormality notifying device 210 has not been detected (No in S401), the operational flow repeats the process of S401. When the abnormality of the relay device 101 having the abnormality notifying device 210 has been detected (Yes in S401), the flow proceeds to S402.

In S402, the controller 211 determines whether the detected abnormality is an abnormality of the relay device 101 or an abnormality of the communication device 102. For example, when the controller 211 receives a notification indicating the abnormality of the communication device 102 from the relay device 101, the controller 211 may determine that the detected abnormality is the abnormality of the communication device 102. When the controller 211 receives a notification indicating the abnormality of the relay device 101 from the relay device 101, or when the controller 211 detects an abnormality of communication between the abnormality notifying device 210 and the relay device 101, the controller 211 may determine that the detected abnormality is the abnormality of the relay device 101.

When the detected abnormality is the abnormality of the communication device 102 (communication device in S402), the flow proceeds to S403. In S403, the controller 211 controls the radio communication unit 213 to cause the radio communication unit 213 to transmit, to the server 103, the abnormality notification 300 including the abnormal location set to the communication device and the abnormality detection relay device set to an identifier of the relay device 101 having the abnormality notifying device 210. Then, the operational flow returns to S401.

When the abnormality detected in S402 is the abnormality of the relay device 101 (relay device in S402), the flow proceeds to S404. In S404, the controller 211 controls the radio communication unit 213 to cause the radio communication unit 213 to transmit, to the server 103, the abnormality notification 300 including the abnormality location set to the relay device and the abnormality detection relay device set to the identifier of the relay device 101 having the concerned abnormality notifying device. Then, the operational flow returns to S401.

According to the operational flow illustrated in FIG. 4, the controller 211 of the abnormality notifying device 210 may detect an abnormality of the relay device 101 having the abnormality notifying device 210 or an abnormality of the communication device 102 connected to the relay device 101 and transmit the abnormality notification 300 including information of a location where the detected abnormality has occurred.

Figure 5:
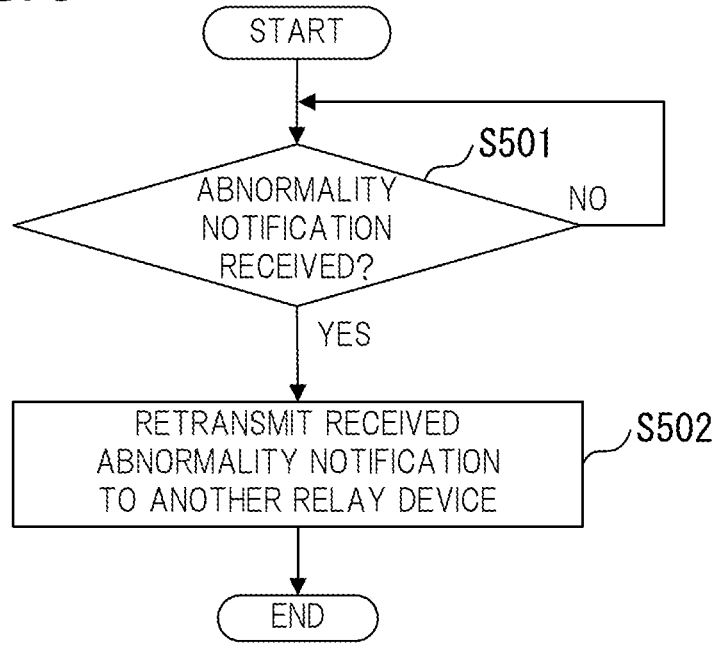
FIG. 5 is a diagram exemplifying an operational flow of a process of transferring the abnormality notification according to the first embodiment.

FIG. 5 is a diagram exemplifying a process of transferring the abnormality notification 300 according to the first embodiment. A controller 211 of an abnormality notifying device 210 attached to a child device watches if it receives the abnormality notification 300 from another abnormality notifying device 210 attached to another relay device 101 (S501).

When the abnormality notification 300 is received (YES, in S501), the controller 211 of the abnormality notifying device 210 attached to the child device causes the abnormality notifying device 210 to copy and to retransmit the abnormality notification 300 received from the other abnormality notifying device 210 attached to the other relay device 101 within a communication range of the abnormality notifying device 210 attached to the child device. Then, the operational flow is terminated.

By the operational flow illustrated in FIG. 5, the abnormality notification 300 is transferred to the abnormality notifying device 210 included in the second ad-hoc network and attached to the relay device 101 serving as the parent device.

Figure 6:
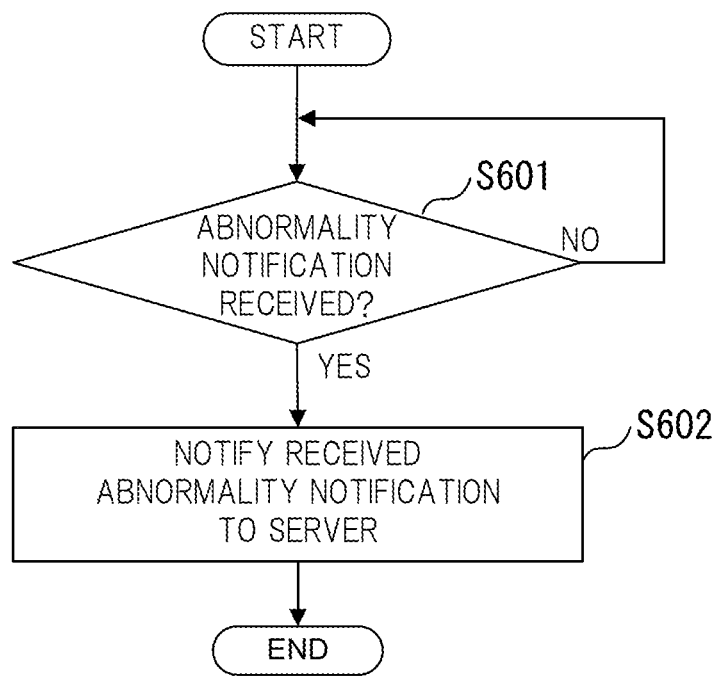
FIG. 6 is a diagram exemplifying an operational flow of a process of transmitting the abnormality notification to a server according to the first embodiment.

FIG. 6 is a diagram exemplifying a process of transmitting the abnormality notification 300 to the server 103 according to the first embodiment. For example, the controller 211 of the abnormality notifying device 210 attached to the relay device 101 serving as the parent device watches if it receives the abnormality notification 300 from an abnormality notifying device 210 attached to a relay device 101 serving as a child device (S601).

When the abnormality notification 300 is received (YES, in S601), the controller 211 of the abnormality notifying device 210 attached to the parent device notifies the received abnormality notification 300 to the server 103 via the mobile phone communication network or the like (S602). Then, the operational flow is terminated.

As described above, in the operational flow illustrated in FIG. 6, the controller 211 of the abnormality notifying device 210 may notify the server 103 of the abnormality notification 300 notified via the second ad-hoc network different from the first ad-hoc network formed by the relay devices 101. An abnormality notifying device 210 different from a relay device 101 detects an abnormality. Thus, even when an abnormality occurs in the relay device 101, the abnormality notifying device 210 may notify the abnormality. In addition, the abnormality notifying device 210 may distinguish an abnormality of the relay device 101 and an abnormality of a communication device 102 from each other and notify the detected abnormalities. Thus, for example, an administrator of the abnormality notification system 100 may identify an abnormal location based on information of the abnormal location identified from the abnormality notification 300 received by the server 103 and correct an abnormality.

Second Embodiment

Next, a second embodiment is described. The second embodiment describes a process of guiding a mobile relay device 700 having a function of moving to a location where a failed relay device 101 exists when an abnormality of the relay device 101 is detected.

Figure 7:
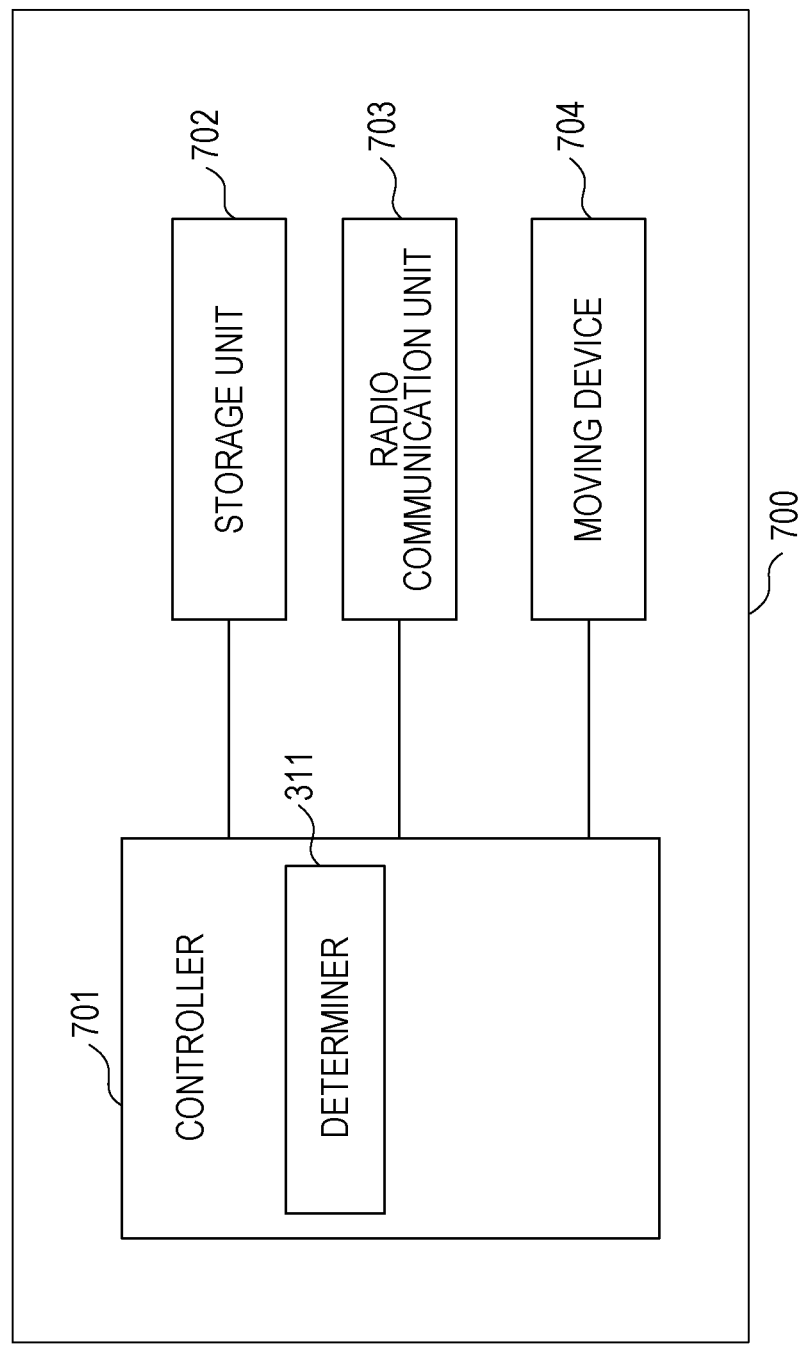
FIG. 7 is a diagram exemplifying a block configuration of a mobile relay device according to a second embodiment.

FIG. 7 is a diagram exemplifying a block configuration of the mobile relay device 700 according to the second embodiment with reference to FIG. 1. The mobile relay device 700 includes a controller 701, a storage unit 702, a radio communication unit 703, and a moving device 704, for example. The controller 701 controls the units of the mobile relay device 700, for example. In the storage unit 702, information including an identifier identifying the mobile relay device 700 may be stored, for example. The radio communication unit 703 uses, for example, near-field communication such as BLE or Wi-Fi (registered trademark) to communicate with another relay device 101 and a communication device 102 in accordance with, for example, an instruction from the controller 701. The radio communication unit 703 may be connected to the mobile phone communication network and may communicate with the server 103 in accordance with an instruction from the controller 701, for example. The moving device 704 may include a device such as a motor for driving a propeller of a drone, a motor for driving wheels of a vehicle, or a steering device for changing a traveling direction and enables the mobile relay device 700 to move in accordance with an instruction from a determiner unit 311 in the controller 701, which determines the travelling direction, for example.

Next, the guiding of the mobile relay device 700 based on the intensity of a radio wave transmitted by an abnormality notifying device 210 attached to a relay device 101 is described.

Figure 8:
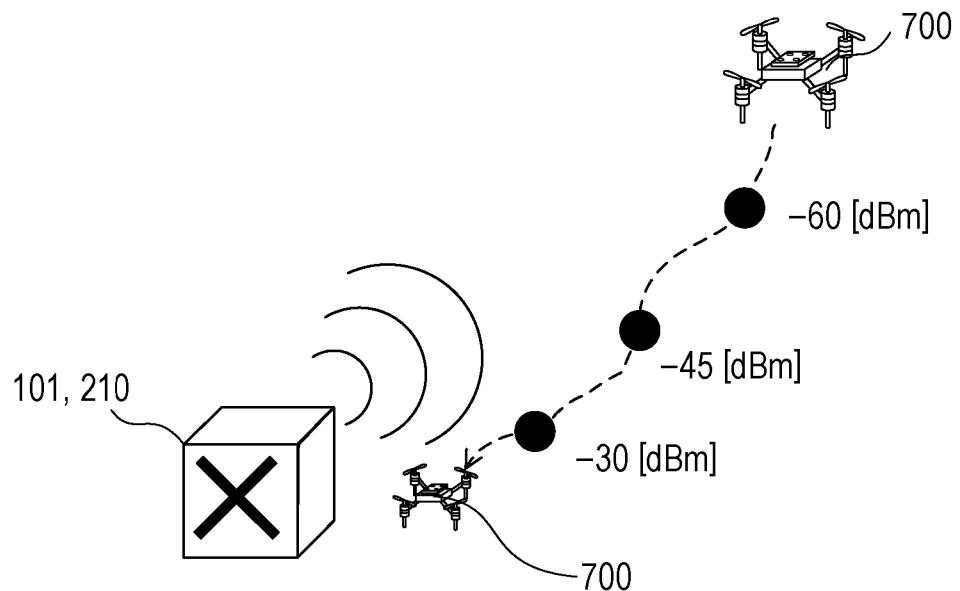
FIG. 8 is a diagram describing the guiding of the mobile relay device based on the intensity of a radio wave according to the second embodiment.

FIG. 8 is a diagram describing the guiding of the mobile relay device 700 based on the intensity of a radio wave according to the second embodiment. As illustrated in FIG. 8, the intensity of a radio wave transmitted by the abnormality notifying device 210 attached to the relay device 101 tends to decrease as the radio wave is more distant from the abnormality notifying device 210. Since the mobile relay device 700 moves toward a position where the intensity of the radio wave transmitted by the abnormality notifying device 210 and indicating the abnormality notification 300 (illustrated in FIG. 3) is higher, the mobile relay device 700 may approach the relay device 101 having the abnormality notifying device 210 that has transmitted the radio wave.

Figure 9:
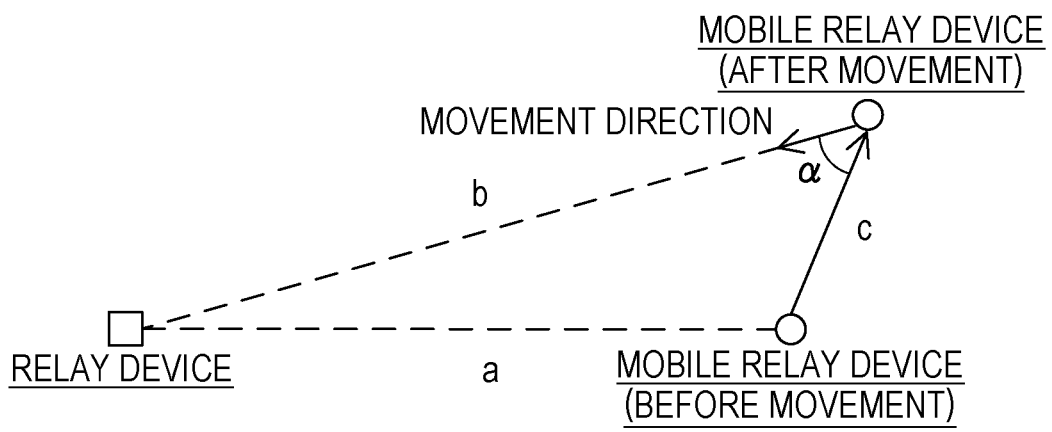
FIG. 9 is a diagram describing the correction of a movement direction according to the second embodiment.

As a specific method for guiding the mobile relay device 700 based on the intensity of a radio wave, the following method is considered, for example. For example, it is assumed that the mobile relay device 700 is moved straight in a random direction at a fixed speed. In this case, as illustrated in FIG. 9, an angle α formed between a direction in which the mobile relay device 700 is moved and a direction in which the mobile relay device 700 approaches the relay device 101 after the movement is calculated according to the following Equation 1.

$$\cos \alpha = \frac{b^2 + c^2 - a^2}{2bc} \quad \text{Equation 1}$$

In Equation 1, a is the distance between the mobile relay device 700 before the movement and the relay device 101, and b is the distance between the mobile relay device 700 after the movement and the relay device 101. In addition, c is a distance that the mobile relay device 700 has moved. Distances a and b are calculated according to the following Equation 2. In Equation 2, d is the distance between the mobile relay device 700 and the relay device 101. In addition, a received signal strength indication (RSSI) indicates the intensity of the radio wave transmitted by the abnormality notifying device 210. TxPower indicates a standard received intensity and may be a received radio wave intensity measured at a position distant by 1 m from a position where the radio wave is emitted. The standard received intensity (TxPower) may be included in the received radio wave, for example.

$$d = 10^{(TxPower-RSSI/20)} \quad \text{Equation 2}$$

The distance that the mobile relay device 700 has moved is indicated by c and may be calculated by using a global positioning system (GPS) or the like to acquire the position of the mobile relay device 700 before the movement and the position of the mobile relay device 700 after the movement or may be calculated by limiting the movement to a linear movement at a fixed speed and multiplying a time period for the movement by the fixed speed. The controller 701 may use the obtained values a, b, and c to calculate the angle α.

The mobile relay device 700 changes the movement direction by the obtained angle α and moves again. The mobile relay device 700 repeatedly changes the movement direction by the angle α calculated according to Equation 1 and moves in the changed direction at predetermined time and thus may approach a gradually failed relay device 101 based on the intensity of the radio wave from the abnormality notifying device 210 attached to the relay device 101.

Next, the guiding of the mobile relay device 700 via multiple relay devices 101 to a target relay device 101 is described.

FIG. 10 is a diagram exemplifying an abnormality notification 1000 according to the second embodiment. In an example illustrated in FIG. 10, with reference to FIG. 1, the abnormality notification 1000 includes information of a signal ID, an abnormality detection relay device, an abnormal location, a previous source, and a source. The signal ID is an identifier identifying the type of a signal. In the example illustrated in FIG. 10, "03" indicates the abnormality notification 1000 according to the second embodiment. In the abnormality detection relay device, an identifier identifying a relay device 101 from which an abnormality has been detected is stored, for example. The abnormal location is information indicating whether the detected abnormality is an abnormality of the relay device 101 or an abnormality of a communication device 102. The previous source indicates an identifier indicating an abnormality notifying device 210 from which a concerned abnormality notifying device 210 that transmits the abnormality notification 1000 has received the abnormality notification 1000. The source indicates an identifier identifying the concerned abnormality notifying device 210 that transmits the abnormality notification 1000. When the concerned abnormality notifying device 210 that transmits the abnormality notification 1000 is being attached to the abnormality detection relay device in which the abnormality has occurred, an identifier identifying the concerned abnormality notifying device 210 may be registered in the previous source. For example, in the abnormality notification 1000 to be transmitted by the concerned abnormality notifying device 210 attached to the abnormality detection relay device, the same identifier of the concerned abnormality notifying device 210 may be registered in the previous source and the source.

Figure 11:
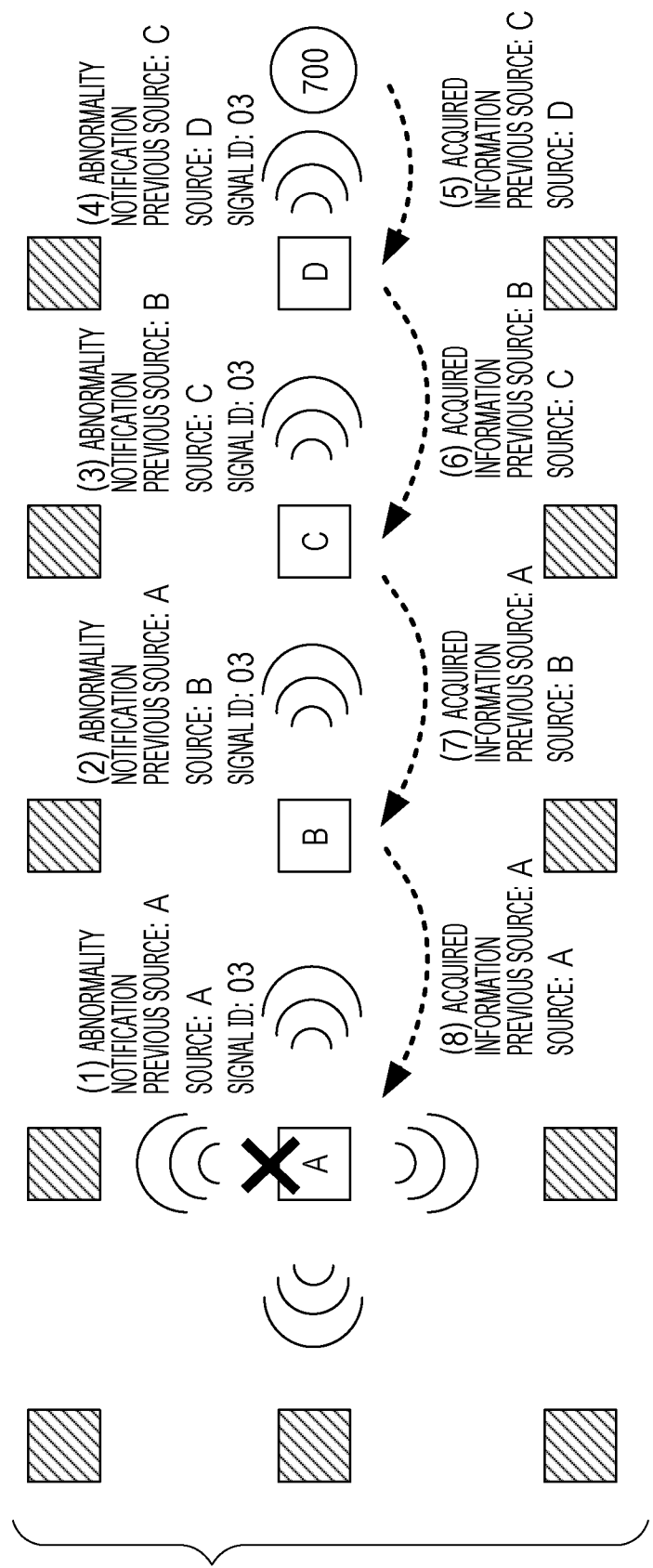
FIG. 11 is a diagram describing the transfer of the abnormality notification.

FIG. 11 is a diagram describing the transfer of the abnormality notification 1000. As illustrated in FIG. 11, with reference to FIG. 1, it is assumed that an abnormality has occurred in a relay device A. In this case, an abnormality notifying device 210 attached to the relay device A transmits the abnormality notification 1000 and notifies the abnormality to another abnormality notifying device 210 attached to another relay device 101 existing in the vicinity of the relay device A within a communication range of the abnormality notifying device 210 attached to the relay device A. In the previous source and the source that are indicated in the abnormality notification 1000, an identifier of the abnormality notifying device A attached to the relay device A may be registered, as indicated by (1) in FIG. 11. In the signal ID, "03" indicating the abnormality notification 1000 may be set.

It is assumed that an abnormality notifying device B attached to a relay device B existing within a communication range of the abnormality notifying device 210 attached to the relay device A receives the abnormality notification 1000. In this case, the abnormality notifying device B attached to the relay device B sets information of A set in the source of the received abnormality notification 1000 in the previous source of the abnormality notification 1000 to be transmitted by the abnormality notifying device B, as indicated by (2) in FIG. 11 (previous source: A). In addition, the abnormality notifying device B sets an identifier B of the abnormality notifying device B in the source of the abnormality notification 1000 to be transmitted by the abnormality notifying device B (source: B).

Similarly, an abnormality notifying device C attached to a relay device C receives the abnormality notification 1000 transmitted by the abnormality notifying device B. The abnormality notifying device C that has received the abnormality notification 1000 sets B set in the source of the received abnormality notification 1000 in the previous source of the abnormality notification 1000 to be transmitted by the abnormality notifying device C, as indicated by (3) in FIG. 11 (previous source: B). The abnormality notifying device C sets an identifier C of the abnormality notifying device C in the source of the abnormality notification 1000 to be transmitted by the abnormality notifying device C (source: C).

Subsequently, an abnormality notifying device D attached to a relay device D receives the abnormality notification 1000 transmitted by the abnormality notifying device C. The abnormality notifying device D that has received the abnormality notification 1000 sets C set in the source of the received abnormality notification 1000 in the previous source of the abnormality notification 1000 to be transmitted by the abnormality notifying device D, as indicated by (4) in FIG. 11 (previous source: C). In addition, the abnormality notifying device D sets an identifier D of the abnormality notifying device D in the source of the abnormality notification 1000 to be transmitted by the abnormality notifying device D (source: D).

For example, when the aforementioned process is repeated and an abnormality notifying device transfers the abnormality notification 1000 while updating the previous source and the source, a previous abnormality notifying device 210 is identified from the information of the abnormality notification 1000. Thus, the mobile relay device 700 may use the received abnormality notification 1000 to trace the abnormality notifying devices 210, thereby moving to the relay device A in which the abnormality has occurred.

For example, FIG. 11 assumes that the mobile relay device 700 receives the abnormality notification 1000 transmitted by the abnormality notifying device D. In this case, the mobile relay device 700 moves toward the abnormality notifying device D by moving so that the intensity of a radio wave indicating the received abnormality notification 1000 increases, and the mobile relay device 700 scans the abnormality notification 1000 from the abnormality notifying device C set in the previous source of the received abnormality notification 1000 ((5) illustrated in FIG. 11). For example, the mobile relay device 700 may scan the abnormality notification 1000 in which C set in the previous source of the received abnormality notification 1000 is set in the source.

When the mobile relay device 700 approaches the abnormality notifying device D, the mobile relay device 700 receives the abnormality notification 1000 transmitted by the abnormality notifying device C. When the mobile relay device 700 receives the abnormality notification 1000 transmitted by the abnormality notifying device C, the mobile relay device 700 moves toward the abnormality notifying device C based on the intensity of a radio wave transmitted by the abnormality notifying device C and indicating the abnormality notification 1000 ((6) illustrated in FIG. 11).

When the mobile relay device 700 approaches the abnormality notifying device C, the mobile relay device 700 receives the abnormality notification 1000 transmitted by the abnormality notifying device B. When the mobile relay device 700 receives the abnormality notification 1000 transmitted by the abnormality notifying device B, the mobile relay device 700 moves toward the abnormality notifying device B based on the intensity of a radio wave transmitted by the abnormality notifying device B and indicating the abnormality notification 1000 ((7) illustrated in FIG. 11). When the mobile relay device 700 approaches the abnormality notifying device B, the mobile relay device 700 receives the abnormality notification 1000 transmitted by the abnormality notifying device A. When the mobile relay device 700 receives the abnormality notification 1000 transmitted by the abnormality notifying device A, the mobile relay device 700 moves toward the abnormality notifying device A based on the intensity of a radio wave transmitted by the abnormality notifying device A and indicating the abnormality notification 1000 ((8) illustrated in FIG. 11).

In this manner, the mobile relay device 700 may trace the transferred abnormality notification 1000 and move to a position close to the relay device A in which the abnormality has occurred. In this case, the mobile relay device 700 may stop moving at the position close to the relay device A and start operating as a relay device 101 instead of the relay device A. In this manner, the mobile relay device 700 may be automatically guided to the abnormal location and operate as the alternative device, thereby correcting the abnormality. Although the example in which the mobile relay device 700 is guided is described above, the second embodiment is not limited to this. For example, to guide a worker who performs a task of replacing relay devices 101 with each other to a relay device 101 in which an abnormality has occurred, a process that is the same as or similar to the aforementioned process may be executed in a terminal held by the worker.

For example, the controller 211 of each abnormality notifying device 210 may use the abnormality notification 1000 instead of the aforementioned abnormality notification 300 to execute the processes illustrated in FIGS. 4 to 6 and transfer the abnormality notification 1000. The controller 211 of the abnormality notifying device 210, however, may set an identifier of the abnormality notifying device 210 in the previous source and the source in S403 and S404 illustrated in FIG. 4. When the controller 211 of the concerned abnormality notifying device 210 receives the abnormality notification 1000 from another abnormality notifying device 210 in S501 illustrated in FIG. 5, the controller 211 may set the other abnormality notifying device set in the source of the received abnormality notification 1000 in the previous source of the abnormality notification 1000 and transmit the abnormality notification 1000 including the source set to an identifier of the concerned abnormality notifying device 210.

Figure 12:
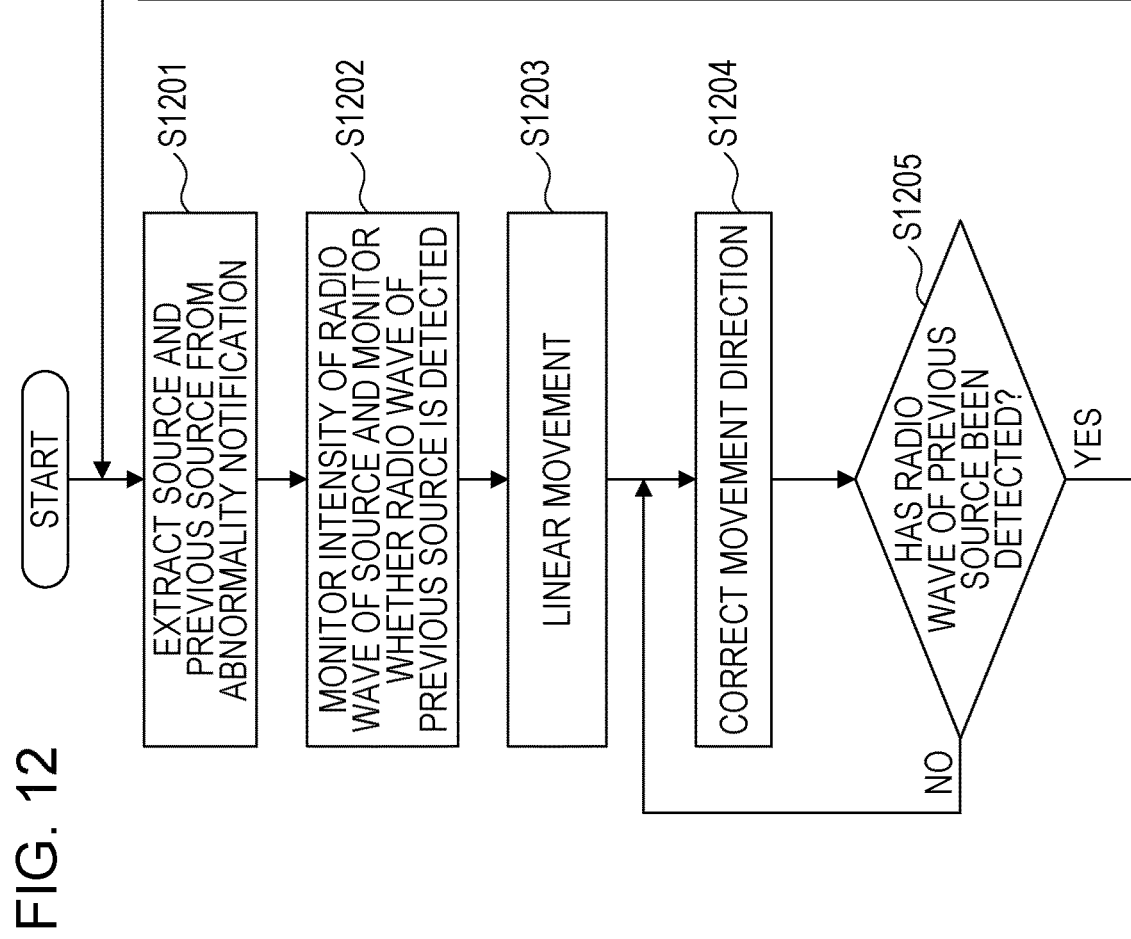
FIG. 12 is a diagram exemplifying a movement process according to the second embodiment.

FIG. 12 is a diagram exemplifying a movement process to be executed by the controller 701 of the mobile relay device 700 according to the second embodiment with reference to FIG. 7. When the controller 701 of the mobile relay device 700 receives an instruction to move to a relay device 101 in which an abnormality has occurred, the controller 701 may start an operational flow illustrated in FIG. 12.

In S1201, the controller 701 of the mobile relay device 700 extracts, from the received abnormality notification 1000, information of an abnormality notifying device 210 set in the source of the received abnormality notification 1000 and information of an abnormality notifying device 210 set in the previous source of the received abnormality notification 1000. In S1202, the controller 701 monitors the intensity of a radio wave indicating the abnormality notification 1000 and received from the abnormality notifying device 210 set in the source and monitors whether a radio wave indicating the abnormality notification 1000 transmitted by the abnormality notifying device 210 set in the previous source is detected.

In S1203, the controller 701 causes the mobile relay device 700 to move straight, for example. For example, when the process of S1203 is executed for the first time in the operational flow illustrated in FIG. 12, the controller 701 may cause the mobile relay device 700 to move straight in a random direction. For example, when the process of S1203 is executed for the second time or later in the operational flow illustrated in FIG. 12, the controller 701 may cause the mobile relay device 700 to move straight in a movement direction corrected in S1204 described below.

In S1204, the controller 701 corrects the movement direction. For example, the controller 701 may calculate the angle α according to the aforementioned Equation 1, change and correct the movement direction based on the calculated angle α, and cause the mobile relay device 700 to approach the abnormality notifying device 210 set in the source.

In S1205, the controller 701 determines whether a radio wave transmitted by the abnormality notifying device 210 set in the previous source has been detected. When the radio wave transmitted by the abnormality notifying device 210 set in the previous source has not been detected (No in S1205), the flow returns to S1204 to repeat the process of S1204. When the radio wave transmitted by the abnormality notifying device 210 set in the previous source has been detected (Yes in S1205), the flow proceeds to S1206.

In S1206, the controller 701 determines whether a value set in the previous source of the abnormality notification 1000 received from the abnormality notifying device 210 set in the previous source is the same as a value set in the source of the abnormality notification 1000 received from the abnormality notifying device 210 set in the previous source. When the values set in the previous source and the source that are indicated in the abnormality notification 1000 received from the abnormality notifying device 210 set in the previous source are not the same, the abnormality notifying device 210 that has transmitted the abnormality notification 1000 is not being attached to the relay device 101 from which the abnormality has been detected. Thus, the controller 701 determines that the answer to the determination of S1206 is NO, the flow returns to S1201, and the controller 701 repeats the process on the abnormality notification 1000 received from the abnormality notifying device set in the previous source. When the values set in the previous source and the source that are indicated in the abnormality notification 1000 received from the abnormality notifying device 210 set in the previous source are the same, the abnormality notifying device 210 that has transmitted the abnormality notification 1000 is being attached to the relay device 101 from which the abnormality has been detected. Thus, the controller 701 determines that the answer to the determination of S1206 is YES, and the flow proceeds to S1207.

In S1207, the mobile relay device 700 approaches the abnormality notifying device 210 until the intensity of the radio wave indicating the abnormality notification 1000 reaches an intensity equal to or higher than a predetermined intensity, and the controller 701 determines that the mobile relay device 700 has reached a position close to the relay device 101 from which the abnormality has been detected. In S1208, the controller 701 receives a connection from a peripheral communication device 102 and starts collecting information from the communication device 102. In S1209, the controller 701 controls the radio communication unit 703 to connect the mobile relay device 700 to the mobile phone communication network and starts transmitting the collected information to the server 103. Then, the operational flow is terminated. In S1209, the controller 701 controls the radio communication unit 703 to connect the mobile relay device 700 to another relay device 101, causes the mobile relay device 700 to participate in the first ad-hoc network formed by the relay devices 101, and transmits the collected information to the server 103 via the other relay device 101.

As described above, according to the operational flow illustrated in FIG. 12, the abnormality notification 1000 may be used to automatically guide the mobile relay device 700 to a position close to a relay device 101 from which an abnormality has been detected.

Third Embodiment

A third embodiment describes a process of suppressing the transmission of the abnormality notification 1000 from abnormality notifying devices 210 that do not exist on a route on which the mobile relay device 700 is guided. For example, when the abnormality notification 1000 is transferred as illustrated in FIG. 11, the abnormality notification 1000, which is transmitted by the abnormality notifying devices 210 attached to the relay devices B to D existing on the route extending to the mobile relay device 700 from the relay device A in which the abnormality has occurred, is used to guide the mobile relay device 700. The abnormality notification 1000, however, is transmitted also to abnormality notifying devices 210 attached to other relay devices 101 existing in the vicinity of the relay devices B to D and indicated by diagonal lines. The transmission of the abnormality notification 1000 by the abnormality notifying devices 210 attached to the other relay devices 101 that do not exist on the route on which the mobile relay device 700 is guided may cause wasteful power consumption and the interference of radio waves. It is, therefore, desirable to suppress the transmission of the abnormality notification 1000 from the abnormality notifying devices 210 attached to the relay devices 101 that do not exist on the route on which the mobile relay device 700 is guided. The process of suppressing the transmission of the abnormality notification 1000 from the abnormality notifying devices 210 attached to the relay devices 101 that do not exist on the route on which the mobile relay device 700 is guided is described below.

FIG. 13 is a diagram exemplifying an abnormality notification 1300 according to the third embodiment. In an example illustrated in FIG. 13, with reference to FIG. 1, the abnormality notification 1300 includes information of a signal ID, an abnormality detection relay device, an abnormal location, a previous source, a source, and a transfer flag. The signal ID is an identifier identifying the type of a signal. In the example illustrated in FIG. 13, "05" indicates the abnormality notification 1300 according to the third embodiment. In the abnormality detection relay device, an identifier identifying a relay device 101 from which an abnormality has been detected is stored, for example. The abnormal location is information indicating whether the detected abnormality is an abnormality of the relay device 101 or an abnormality of a communication device 102. The previous source is an identifier of an abnormality notifying device 210 from which a concerned abnormality notifying device 210 that transmits the abnormality notification 1300 has received the abnormality notification 1300. The source is an identifier identifying the abnormality notifying device 210 that transmits the abnormality notification 1300. When the concerned abnormality notifying device 210 that transmits the abnormality notification 1300 is being attached to the relay device 101 from which the abnormality has been detected, an identifier identifying the concerned abnormality notifying device 210 may be registered in the previous source. In this case, in the abnormality notification 1300 to be transmitted by the concerned abnormality notifying device 210 attached to the relay device from which the abnormality has been detected, the same identifier of the concerned abnormality notifying device 210 may be registered in the previous source and the source. The transfer flag indicates whether the abnormality notification 1300 has been transferred to the mobile relay device 700. For example, when the transfer flag indicates ON, the transfer flag may indicate that the abnormality notification 1300 is being transferred toward the mobile relay device 700. When the transfer flag indicates OFF, the transfer flag may indicate that the abnormality notification 1300 has been transferred to the mobile relay device 700.

FIGS. 14A and 14B are diagrams exemplifying a reception completion notification 1401 and a reception completion response 1402 according to the third embodiment. FIG. 14A illustrates an example of the reception completion notification 1401. The reception completion notification 1401 includes information of a signal ID, a source, and a target destination, for example. The signal ID is an identifier identifying the type of a signal. In the example illustrated in FIG. 14A, with reference to FIGS. 1 and 7, "06" indicates the reception completion notification 1401 according to the third embodiment. The source is the identifier identifying the mobile relay device 700 that transmits the reception completion notification 1401. In the example illustrated in FIG. 14A, an identifier "0100" identifying the mobile relay device 700 is registered. In the target destination, an identifier indicating an abnormality notifying device 210 to which the reception completion notification 1401 is transmitted may be registered. For example, the mobile relay device 700 may set, in the target destination of the reception completion notification 1401, an abnormality notifying device 210 set in the source of the received abnormality notification 1300.

FIG. 14B is a diagram exemplifying the reception completion response 1402. The reception completion response 1402 includes information of a signal ID, a source, and a target destination, for example. The signal ID is an identifier identifying the type of a signal. In the example illustrated in FIG. 14B, with reference to FIGS. 1 and 7, "07" indicates the reception completion response 1402. The source is an identifier identifying a device that transmits the reception completion response 1402. In the example illustrated in FIG. 14B, an identifier identifying an abnormality notifying device 210 that has received the reception completion notification 1401 may be registered in the source. In the target destination, the identifier indicating the mobile relay device 700 to which the reception completion response 1402 is transmitted may be registered.

The following describes, with reference to FIGS. 2, 7, 15 and 16, the process of suppressing the transmission of the abnormality notification 1000 from the abnormality notifying devices 210 that do not exist on the route on which the mobile relay device 700 is guided using the abnormality notification 1300, the reception completion notification 1401, and the reception completion response 1402.

Figure 15:
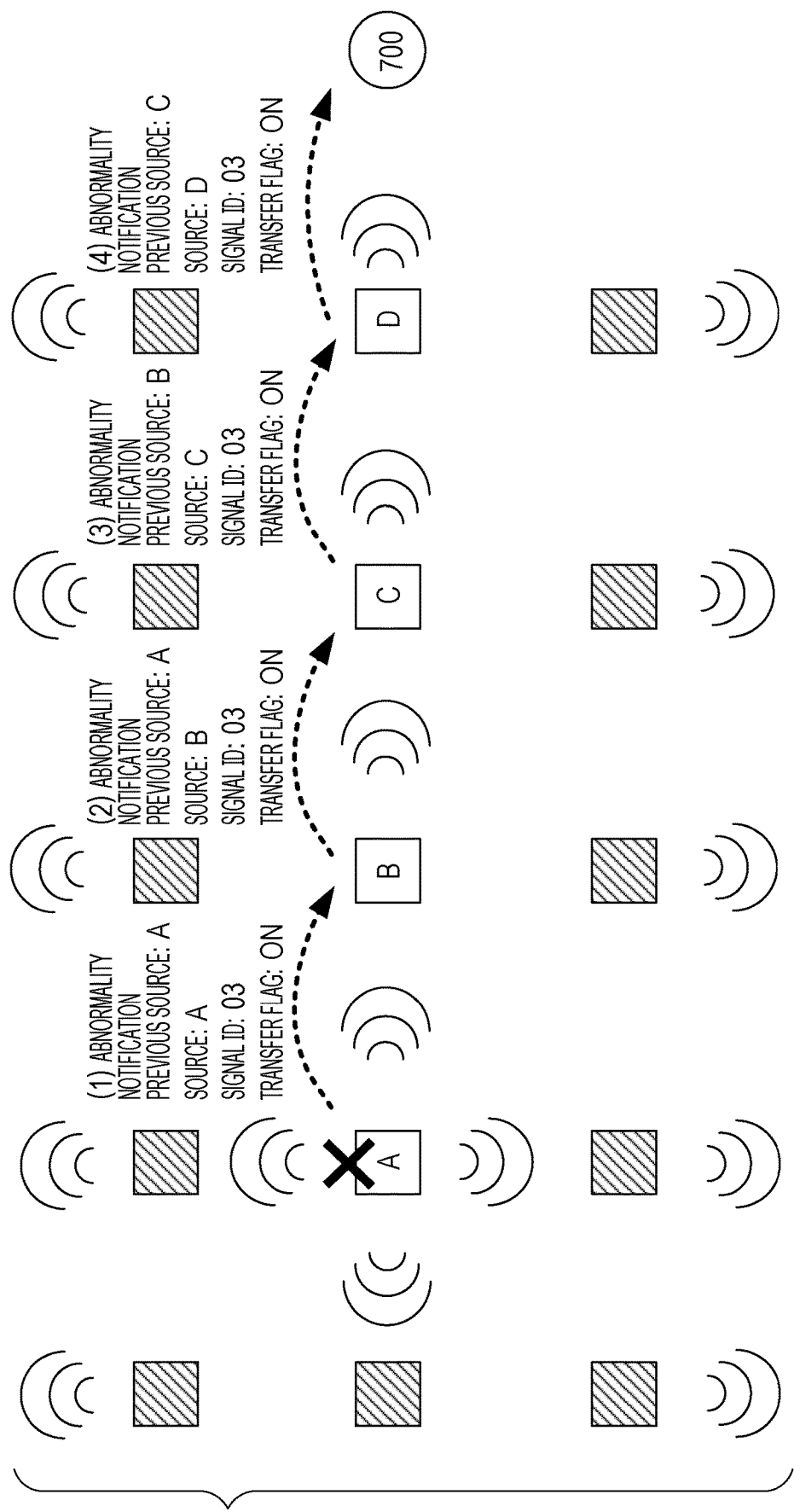
FIG. 15 is a diagram exemplifying a process of transferring the abnormality notification including a transfer flag set to ON according to the third embodiment.

FIG. 15 is a diagram exemplifying a process of transferring the abnormality notification 1300 according to the third embodiment. For example, it is assumed that the abnormality notifying device A attached to the relay device A illustrated in FIG. 15 detects an abnormality and transmits the aforementioned abnormality notification 1300. In this case, as indicated by (1) in FIG. 15, in the previous source and the source that are indicated in the abnormality notification 1300, the identifier A identifying the abnormality notifying device A attached to the relay device A is registered. In the signal ID, "05" indicating the abnormality notification 1300 may be set. The transfer flag may be set to ON indicating that the abnormality notification 1300 is being transferred toward the mobile relay device 700.

When abnormality notifying devices 210 attached to relay devices 101 receive the abnormality notification 1300, the abnormality notifying devices 210 transmit the abnormality notification 1300 in which the information of the previous source and the source has been changed in the same manner as exemplified in FIG. 11. In this case, the abnormality notifying devices 210 attached to the relay devices 101 transfer the abnormality notification 1300 to abnormality notifying devices 210 attached to peripheral relay devices 101 ((2) and (3) illustrated in FIG. 15).

The mobile relay device 700 receives the abnormality notification 1300 transferred by an abnormality notifying device 210 ((4) illustrated in FIG. 15). The mobile relay device 700 recognizes a previous abnormality notifying device 210 from the information of the abnormality notification 1300. Thus, the mobile relay device 700 may use the received abnormality notification 1300 to trace the abnormality notifying devices 210, thereby moving to the relay device A in which the abnormality has occurred.

The abnormality notification 1300 is transferred to the abnormality notifying devices 210 attached to the relay devices 101 that do not exist on the route on which the mobile relay device 700 is guided. Thus, the abnormality notifying devices 210 (indicated by diagonal lines in FIG. 16) attached to the relay devices 101 that do not exist on the route on which the mobile relay device 700 is guided start transmitting the abnormality notification 1300. Thus, when the mobile relay device 700 receives the abnormality notification 1300, the mobile relay device 700 transmits the reception completion notification 1401 to suppress the transmission of the abnormality notification 1300 from the abnormality notifying devices 210 attached to the relay devices 101 that do not exist on the route on which the mobile relay device 700 is guided ((5) illustrated in FIG. 16).

Figure 16:
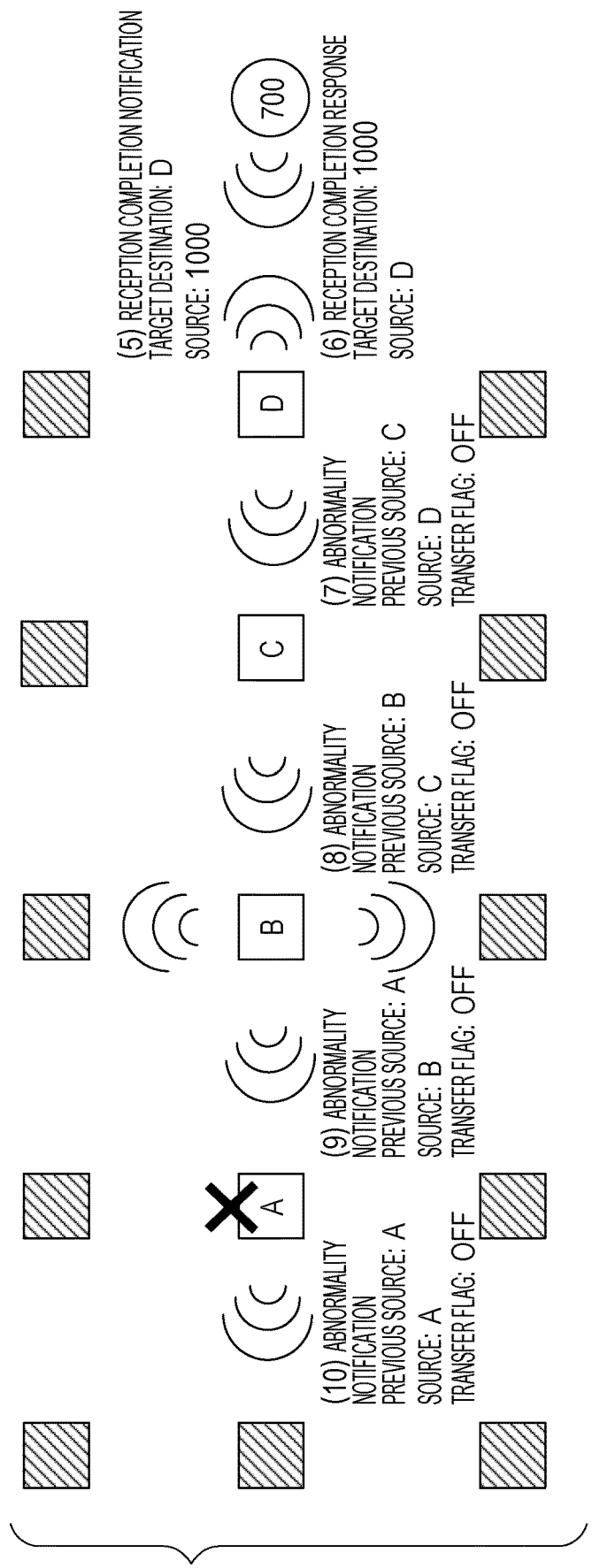
FIG. 16 is a diagram exemplifying a process of transferring the abnormality notification including the transfer flag set to OFF according to the third embodiment.

When the abnormality notifying device D attached to the relay device D receives the reception completion notification 1401 from the mobile relay device 700, the abnormality notifying device D transmits the reception completion response 1402 as a response and notifies the reception of the reception completion notification 1401 to the mobile relay device 700 ((6) illustrated in FIG. 16). When the mobile relay device 700 receives the reception completion response 1402, the mobile relay device 700 stops the transmission of the reception completion notification 1401.

When the abnormality notifying device D attached to the relay device D receives the reception completion notification 1401, the abnormality notifying device D changes the transfer flag of the abnormality notification 1300 from ON to OFF and transmits the abnormality notification 1300 ((7) illustrated in FIG. 16).

When the abnormality notifying device C attached to the relay device C receives the abnormality notification 1300 including the transfer flag set to OFF, the abnormality notifying device C determines whether the previous source of the received abnormality notification 1300 indicates the abnormality notifying device C. When the previous source indicates the abnormality notifying device C, the abnormality notifying device C changes, from ON to OFF, the transfer flag of the abnormality notification 1300 to be transmitted by the abnormality notifying device C and continues to transmit the abnormality notification 1300 ((8) illustrated in FIG. 16).

In the same manner, when the abnormality notifying devices 210 attached to the relay devices B and A receive abnormality notification 1300 including the transfer flag set to OFF, the abnormality notifying devices 210 attached to the relay devices B and A determine whether the previous source of the received abnormality notification 1300 indicates the abnormality notifying devices 210 attached to the relay devices B and A. When the previous source of the received abnormality notification 1300 indicates the abnormality notifying devices 210 attached to the relay devices B and A, the abnormality notifying devices 210 change, from ON to OFF, the transfer flag of the abnormality notification 1300 to be transmitted by the abnormality notifying devices 210 and continue to transmit the abnormality notification 1300 ((9) and (10) illustrated in FIG. 16). In this manner, the abnormality notifying devices 210 attached to the relay devices 101 existing on the route on which the mobile relay device 700 is guided receive the abnormality notification 1300 including the previous source set to the abnormality notifying devices 210 and continue to transmit the abnormality notification 1300.

For example, when an abnormality notifying device 210 attached to a relay device 101 that does not exist on the route on which the mobile relay device 700 is guided receives the abnormality notification 1300 including the transfer flag set to OFF, the abnormality notifying device 210 determines whether the previous source of the received abnormality notification 1300 indicates the abnormality notifying device 210. Since the abnormality notifying device 210 attached to the relay device 101 that does not exist on the route on which the mobile relay device 700 is guided is not set in the previous source of the received abnormality notification 1300, the abnormality notifying device 210 attached to the relay device 101 determines that the previous source does not indicate the abnormality notifying device 210. In this case, the abnormality notifying device 210 attached to the relay device 101 changes, from ON to OFF, the transfer flag of the abnormality notification 1300 to be transmitted by the abnormality notifying device 210 and transmits the abnormality notification 1300 during a predetermined time period. After the predetermined time period elapses, the abnormality notifying device 210 attached to the relay device 101 stops the transmission of the abnormality notification 1300. Thus, it may be possible to suppress continuous transmission of the abnormality notification 1300 from the abnormality notifying devices 210 attached to the relay devices 101 not existing on the route on which the mobile relay device 700 is guided and to suppress wasteful power consumption. In addition, it may be possible to suppress the interference of radio waves that is caused by the abnormality notification 1300 transmitted by the abnormality notifying devices 210 attached to the relay devices 101 that do not exist on the route on which the mobile relay device 700 is guided. When the abnormality notifying device 210 determines that the previous source does not indicate the abnormality notifying device 210, the abnormality notifying device 210 may transmit the abnormality notification 1300 including the transfer flag set to OFF during a predetermined time period to convey the suppression of the transmission of the abnormality notification 1300 to an abnormality notifying device 210 attached to a peripheral relay device 101.

Next, operational flows for executing transmission control on the abnormality notification 1300 described with reference to FIGS. 2, 7, 15 and 16 are described. The abnormality notification 1300 including the transfer flag set to ON may be transferred in the same manner as the aforementioned abnormality notification 1000.

Figure 17:
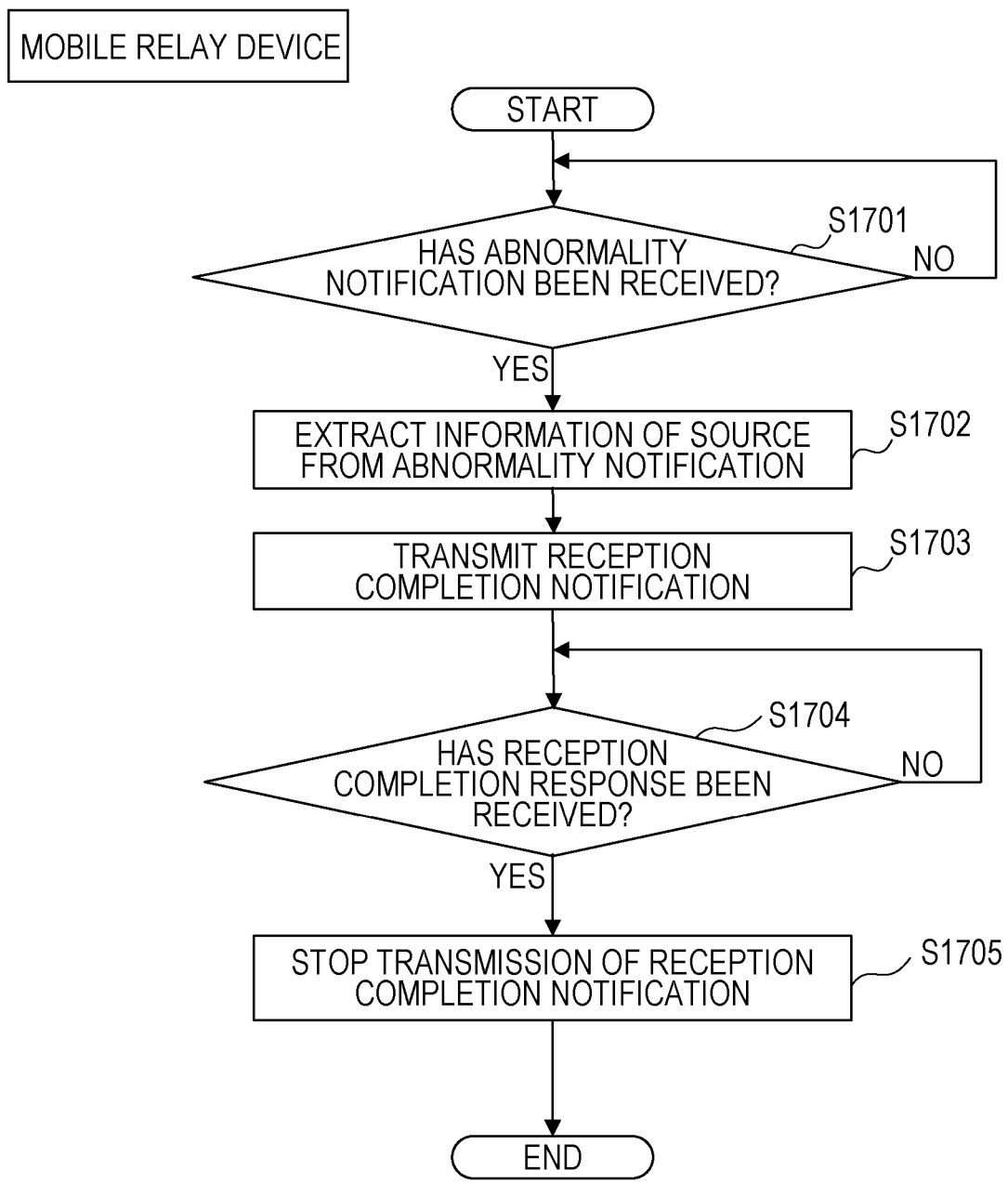
FIG. 17 is a diagram exemplifying a process of transmitting the reception completion notification by a controller of the mobile relay device according to the third embodiment.

FIG. 17 is a diagram exemplifying a process of transmitting the reception completion notification 1401 by the mobile relay device according to the third embodiment. For example, when the mobile relay device 700 is activated, the controller 701 of the mobile relay device 700 may start an operational flow illustrated in FIG. 17.

In S1701, the controller 701 determines whether the mobile relay device 700 has received the abnormality notification 1300 including the transfer flag set to ON. When the mobile relay device 700 has not received the abnormality notification 1300 including the transfer flag set to ON (No in S1701), the flow repeats the process of S1701. When the mobile relay device 700 has received the abnormality notification 1300 including the transfer flag set to ON (Yes in S1701), the flow proceeds to S1702.

In S1702, the controller 701 extracts information of an abnormality notifying device 210 set in the source from the abnormality notification 1300. In S1703, the controller 701 sets the abnormality notifying device 210 set in the source in the target destination of the reception completion notification 1401 and transmits the reception completion notification 1401 including the source set to the identifier of the mobile relay device 700.

In S1704, the controller 701 determines whether the mobile relay device 700 has received the reception completion response 1402 including the target destination set to the mobile relay device 700 as a response to the transmitted reception completion notification 1401 from the abnormality notifying device 210 set in the target destination of the reception completion notification 1401. When the mobile relay device 700 has not received the reception completion response 1402 (No in S1704), the flow returns to S1704 and repeats the process of S1704. On the other hand, when the mobile relay device 700 has received the reception completion response 1402 (Yes in S1704), the flow proceeds to S1705.

In S1705, the controller 701 stops the transmission of the reception completion notification 1401. Then, the operational flow is terminated.

As described above, in the operational flow illustrated in FIG. 17, the controller 701 of the mobile relay device 700 may notify the abnormality notifying device 210 set in the source of the abnormality notification 1300 that the mobile relay device 700 has received the abnormality notification 1300.

Figure 18:
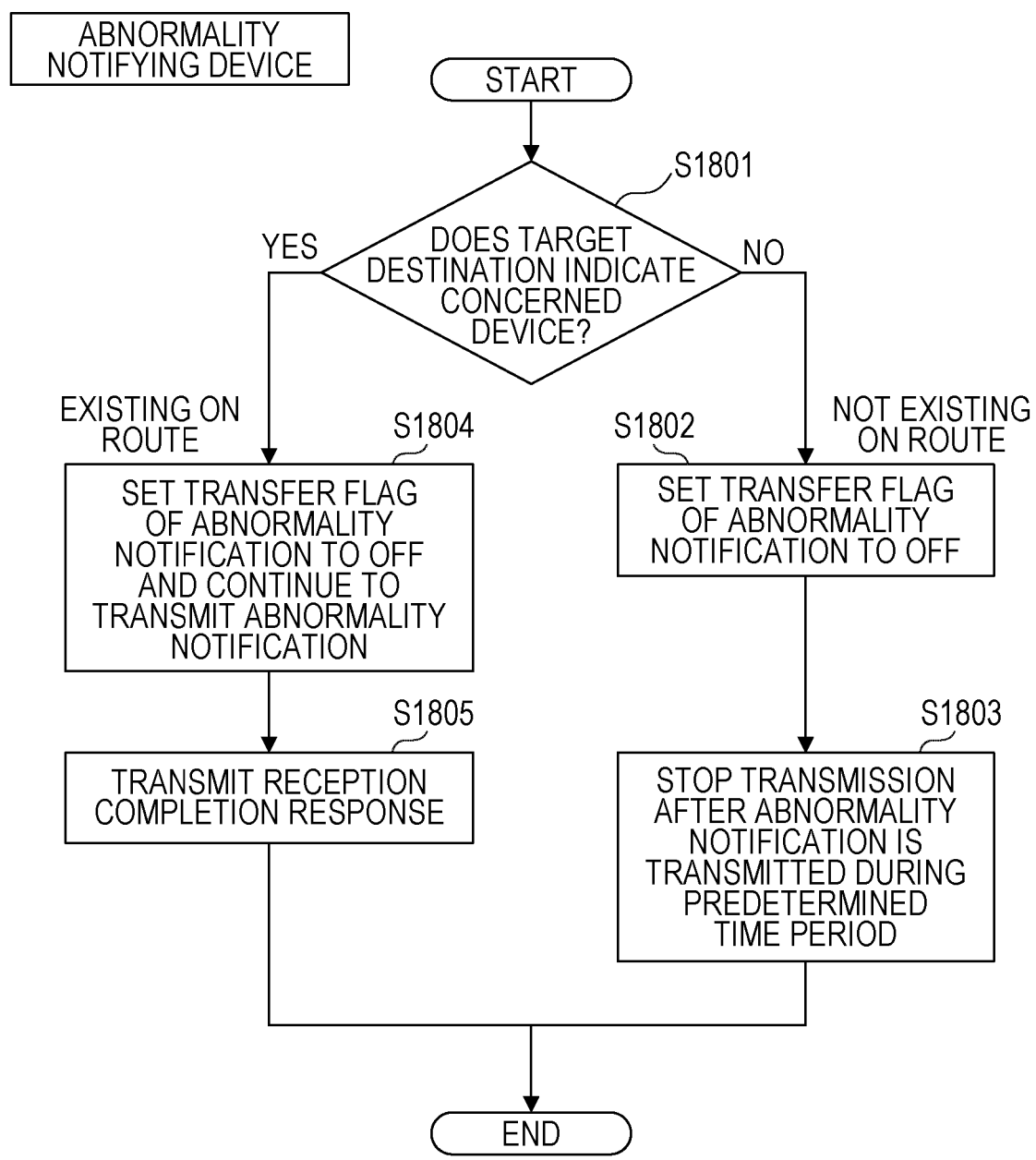
FIG. 18 is a diagram exemplifying a process of transmitting a response to the reception completion notification by a controller of an abnormality notifying device attached to a relay device according to the third embodiment.

FIG. 18 is a diagram exemplifying a process of transmitting a response to the reception completion notification 1401 by a controller 211 of an abnormality notifying device 210 attached to a relay device 101 illustrated in FIG. 2, according to the third embodiment. When the controller 211 of the abnormality notifying device 210 attached to the relay device 101 receives the reception completion notification 1401, the controller 211 may start an operational flow illustrated in FIG. 18, with reference to FIGS. 2 and 7, for example.

In S1801, the controller 211 of the abnormality notifying device 210 determines whether the target destination of the received reception completion notification 1401 indicates the concerned abnormality notifying device 210. When the target destination of the received reception completion notification 1401 does not indicate the concerned abnormality notifying device 210 (No in S1801), the flow proceeds to S1802. In this case, the abnormality notifying device 210 that has received the reception completion notification 1401 is being attached to the relay device 101 that does not exist on the route on which the mobile relay device 700 is guided.

In S1802, the controller 211 sets the transfer flag of the abnormality notification 1300 to be transmitted to OFF indicated by a value indicating that the transfer of the abnormality notification 1300 to the mobile relay device 700 has been completed.

In S1803, the controller 211 transmits the abnormality notification 1300 during a predetermined time period and stops the transmission of the abnormality notification 1300. Then, the operational flow is terminated.

When the target destination of the received reception completion notification 1401 indicates the concerned abnormality notifying device 210 (Yes in S1801), the flow proceeds to S1804. In this case, the abnormality notifying device 210 that has received the reception completion notification 1401 is being attached to the relay device 101 existing on the route on which the mobile relay device 700 is guided.

In S1804, the controller 211 sets the transfer flag of the abnormality notification 1300 to be transmitted to OFF indicated by the value indicating that the transfer of the abnormality notification 1300 to the mobile relay device 700 has been completed, and the controller 211 continues to transmit the abnormality notification 1300.

In S1805, the controller 211 sets, in the target destination of the reception completion response 1402, the identifier of the mobile relay device 700 set in the source of the received reception completion notification 1401 and transmits the reception completion response 1402 including the source set to the identifier of the concerned abnormality notifying device 210. Then, the operational flow is terminated.

By the operational flow illustrated in FIG. 18, the transfer of the abnormality notification 1300 including the transfer flag set to OFF is started.

Figure 19:
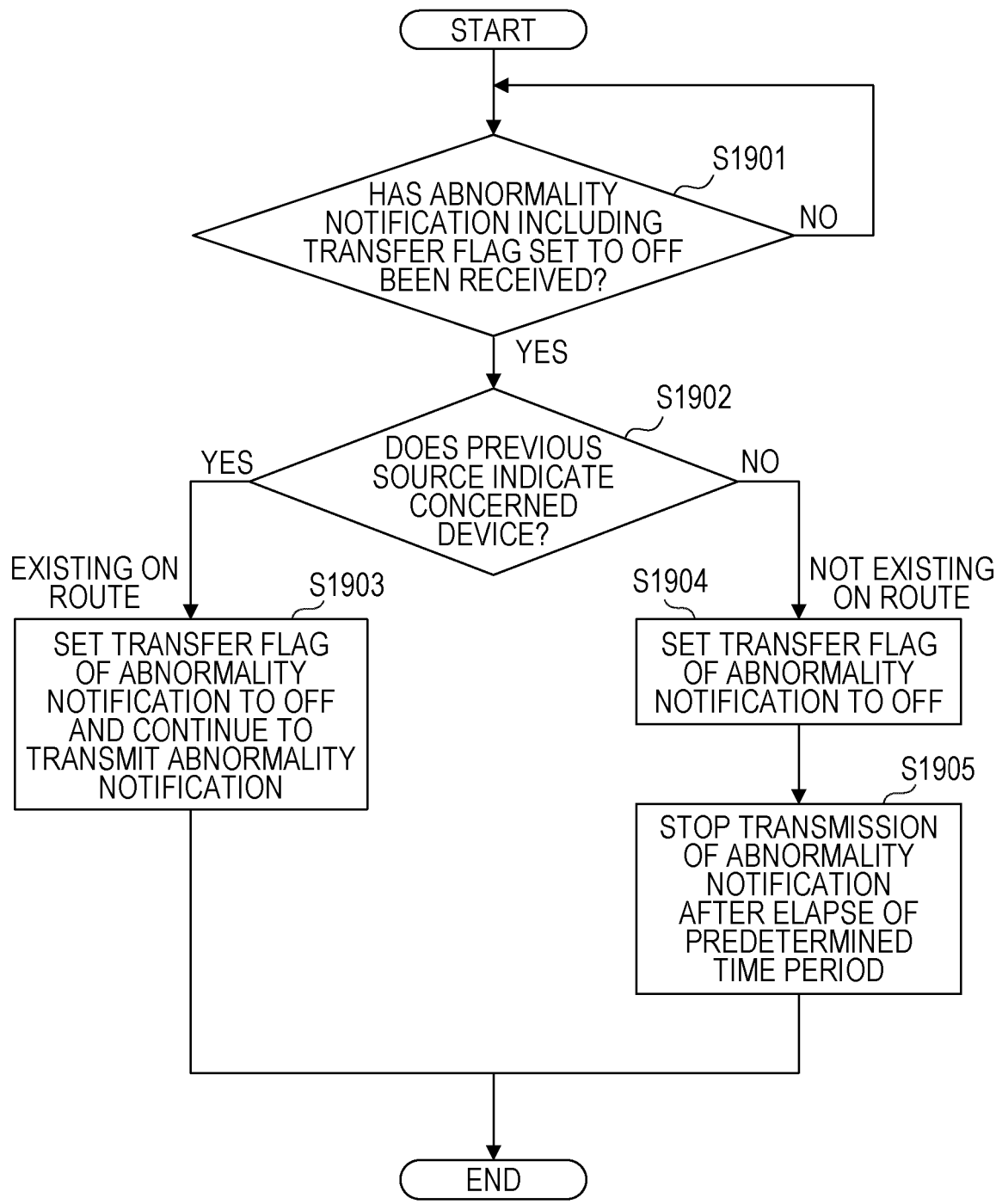
FIG. 19 is a diagram exemplifying an operational flow of a process of transferring the abnormality notification according to the third embodiment.

FIG. 19 is a diagram exemplifying an operational flow of a process of controlling the transfer of the abnormality notification 1300 according to the third embodiment. When a controller 211 of an abnormality notifying device 210 attached to a relay device 101, illustrated in FIG. 2, starts the transmission of the abnormality notification 1300, the controller 211 may start an operational flow illustrated in FIG. 19.

In S1901, the controller 211 of the abnormality notifying device 210 attached to the relay device 101 determines whether the abnormality notifying device 210 has received the abnormality notification 1300 including the transfer flag set to OFF. When the abnormality notifying device 210 has not received the abnormality notification 1300 including the transfer flag set to OFF (No in S1901), the flow repeats the process of S1901. When the abnormality notifying device 210 has received the abnormality notification 1300 including the transfer flag set to OFF (Yes in S1901), the flow proceeds to S1902.

In S1902, the controller 211 confirms the previous source of the received abnormality notification 1300 including the transfer flag set to OFF and determines whether the previous source indicates an identifier identifying the concerned abnormality notifying device 210. When the previous source indicates the identifier identifying the concerned abnormality notifying device 210 (Yes in S1902), the flow proceeds to S1903. In this case, the concerned abnormality notifying device 210 is being attached to the relay device 101 existing on the route on which the mobile relay device 700 is guided. In S1903, the controller 211 sets, to OFF, the transfer flag of the abnormality notification 1300 to be transmitted by the concerned abnormality notifying device 210 and continues to transmit the abnormality notification 1300. Then, the operational flow is terminated.

When the previous source does not indicate the identifier identifying the concerned abnormality notifying device 210 (No in S1902), the flow proceeds to S1904. In this case, the concerned abnormality notifying device 210 is being attached to the relay device 101 that does not exist on the route on which the mobile relay device 700 is guided.

In S1904, the controller 211 sets, to OFF, the transfer flag of the abnormality notification 1300 to be transmitted by the concerned abnormality notifying device 210. In S1905, the controller 211 transmits the abnormality notification 1300 during a predetermined time period and stops the transmission of the abnormality notification 1300. Then, the operational flow is terminated. Since the controller 211 continues to transmit the abnormality notification 1300 during the predetermined time period, the controller 211 may transfer the abnormality notification 1300 including the transfer flag set to OFF to, for example, an abnormality notifying device 210 attached to another relay device 101 existing within a communication range of the concerned abnormality notifying device 210 and stop the transmission of the abnormality notification 1300.

In the operational flow illustrated in FIG. 19, when the concerned abnormality notifying device 210 does not exist on the route on which the mobile relay device 700 is guided, the controller 211 of the abnormality notifying device 210 attached to the relay device 101 may stop the transmission of the abnormality notification 1300 and suppress power consumption. In addition, since the number of abnormality notifying devices 210 that transmit the abnormality notification 1300 is reduced, it may be possible to suppress a radio wave failure caused by the transmitted abnormality notification 1300.

Although the embodiments are exemplified, the embodiments are not limited to this. For example, the aforementioned operational flows are examples, and the embodiments are not limited to this. The order in which processes included in the operational flows are executed may be changed, and the operational flows may be executed. An additional process may be included in one or more of the operational flows. One or more of processes included in the operational flows may be omitted.

Although the aforementioned embodiments describe the processes of causing abnormality notifying devices 210 to transmit the abnormality notifications 1000 and 1300 and guiding the mobile relay device 700, the embodiments are not limited to this. For example, in an embodiment, when an abnormality notifying device 210 is not attached to a relay device 101, the relay device 101 may transmit the abnormality notification 1000 or 1300 to guide the mobile relay device 700 and may execute the process of suppressing the transmission of the abnormality notification 1000 or 1300.

For example, the abnormality notifying devices 210 may include respective batteries and operate with power supplied from the batteries included in the abnormality notifying devices 210. Alternatively, the abnormality notifying devices 210 may receive power supplied from batteries included in the relay devices 101 and operate. As an example, the abnormality notifying devices 210 may receive power supplied from the batteries included in the relay devices 101 and operate while charging the batteries of the abnormality notifying devices 210. When an abnormality occurs in a relay device 101, an abnormality notifying device 210 attached to the relay device 101 may use power supplied from a battery included in the abnormality notifying device 210 and operate.

Figure 20:
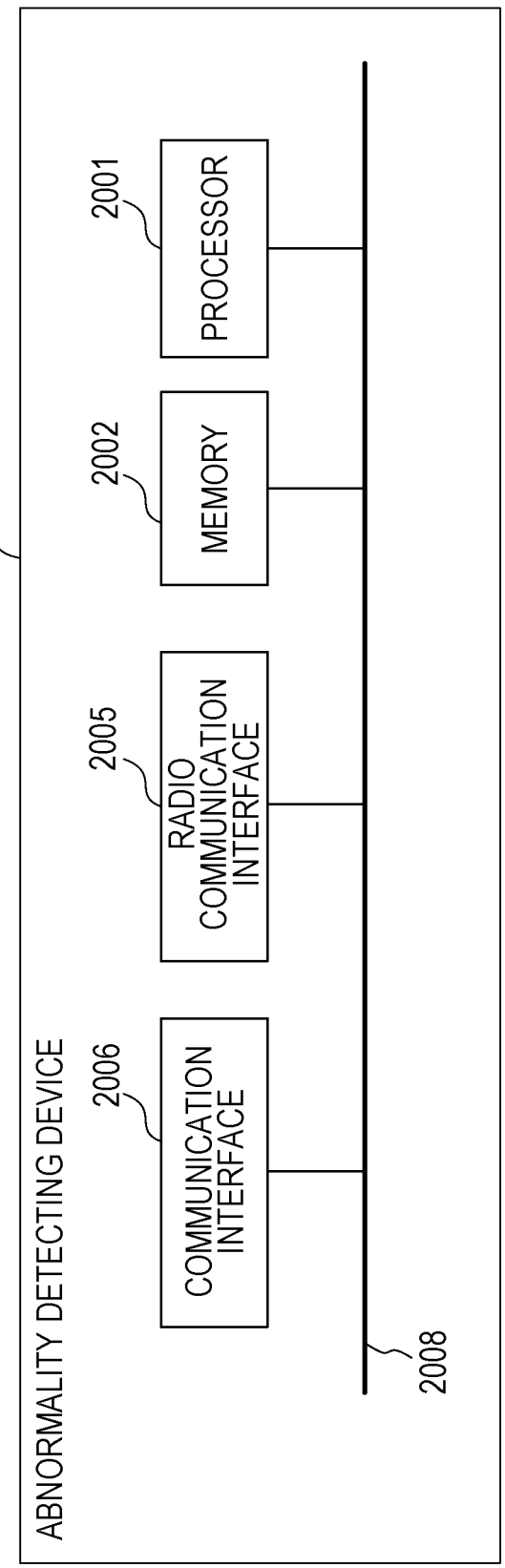
FIG. 20 is a diagram exemplifying a hardware configuration that enables each of abnormality notifying devices according to the embodiments.

FIG. 20 is a diagram exemplifying a hardware configuration that enables each of the abnormality notifying devices 210 according to the embodiments. The hardware configuration that enables each of the abnormality notifying devices 210 and is illustrated in FIG. 20 includes, for example, a processor 2001, a memory 2002, a radio communication interface 2005, and a communication interface 2006. The processor 2001, the memory 2002, the radio communication interface 2005, and the communication interface 2006 are connected to each other via, for example, a bus 2008.

The processor 2001 may be a single processor, a multi-processor, or a multicore processor. The processor 2001 uses the memory 2002 to execute a program in which the procedures for the aforementioned operational flows are described, thereby enabling some or all of the functions of the aforementioned controller 211.

The memory 2002 is, for example, a semiconductor memory and may include a RAM region and a ROM region. RAM is an abbreviation of random access memory. ROM is an abbreviation of read only memory. The aforementioned storage unit 212 includes the memory 2002, for example. In the memory 2002, an identifier identifying the concerned abnormality notifying device 210 is stored, for example.

The radio communication interface 2005 may include a Wi-Fi communication device and a Bluetooth communication device and may form the second ad-hoc network with the other abnormality notifying devices 210, for example. When a relay device 101 connected to the abnormality notifying device 210 is the parent device, the radio communication interface 2005 may be connected to the mobile phone communication network and communicate with the server 103, for example. The radio communication interface 2005 is, for example, an example of the aforementioned radio communication unit 213.

The communication interface 2006 may be a wired connection interface such as a USB interface and relays communication with the relay device 101 connected to the concerned abnormality notifying device 210. The processor 2001 may detect an abnormality of the relay device 101 based on a notification indicating the abnormality and received from the relay device 101 via the communication interface 2006. For example, when the communication interface 2006 does not receive a response from the relay device 101, the processor 2001 may detect an abnormality of the relay device 101. The communication interface 2006 is, for example, an example of the aforementioned communication unit 214.

FIG. 21 is a diagram exemplifying a hardware configuration that enables each of the relay devices 101 according to the embodiments. The hardware configuration that enables each of the relay devices 101 and is illustrated in FIG. 21 includes, for example, a processor 2101, a memory 2102, a storage device 2103, a radio communication interface 2105, and a communication interface 2106. The processor 2101, the memory 2102, the storage device 2103, the radio communication interface 2105, and the communication interface 2106 are connected to each other via, for example, a bus 2108.

The processor 2101 may be a single processor, a multi-processor, or a multicore processor. The processor 2101 may use, for example, the memory 2102 to execute a program, thereby operating as the aforementioned controller 201 and enabling the aforementioned functions of the relay device 101.

The memory 2102 is, for example, a semiconductor memory and may include a RAM region and a ROM region. The storage device 2103 is, for example, an external storage device or a semiconductor memory such as a hard disk or a flash memory. The aforementioned storage unit 202 includes, for example, the memory 2102 and the storage device 2103.

The radio communication interface 2105 may include a Wi-Fi communication device and a Bluetooth communication device and may form the first ad-hoc network with the other relay devices 101, for example. When the relay device 101 is the parent device, the radio communication interface 2105 may be connected to, for example, the mobile phone communication network and communicate with the server 103. The radio communication interface 2105 is, for example, an example of the aforementioned radio communication unit 203.

The communication interface 2106 may be a wired connection interface such as a USB interface and relays communication with the abnormality notifying device 210 connected to the concerned relay device 101. When the processor 2101 detects an abnormality of the concerned relay device 101, the processor 2101 responds to an inquiry from the abnormality notifying device 210 attached to the concerned relay device 101 so as to transmit information of the abnormality of the concerned relay device 101 to the abnormality notifying device 210 via the communication interface 2106. The communication interface 2106 is, for example, an example of the aforementioned communication unit 204.

FIG. 22 is a diagram exemplifying a hardware configuration that enables the mobile relay device 700 according to the second and third embodiments. The hardware configuration that enables the mobile relay device 700 and is illustrated in FIG. 22 includes, for example, a processor 2201, a memory 2202, a storage device 2203, a radio communication interface 2205, and a moving device 704. The processor 2201, the memory 2202, the storage device 2203, the radio communication interface 2205, and the moving device 704 are connected to each other via, for example, a bus 2208.

The processor 2201 may be a single processor, a multiprocessor, or a multicore processor. The processor 2201 uses the memory 2202 to execute a program in which the procedures for the aforementioned operational flows are described, thereby enabling some or all of the functions of the aforementioned controller 701, for example.

The memory 2202 is, for example, a semiconductor memory and may include a RAM region and a ROM region. The storage device 2203 is, for example, an external storage device or a semiconductor memory such as a hard disk or a flash memory. The aforementioned storage unit 702 includes, for example, the memory 2202 and the storage device 2203. For example, in the storage device 2203, the identifier identifying the mobile relay device 700 may be stored.

The radio communication interface 2205 may include a Wi-Fi communication device and a Bluetooth communication device, for example. The mobile relay device 700 may participate in the first ad-hoc network formed by the relay devices 101 via the radio communication interface 2205. The controller 701 of the mobile relay device 700 may communicate with an abnormality notifying device 210 and a communication device 102 via the radio communication interface 2205, for example. The radio communication interface 2205 may be connected to the mobile phone communication network and communicate with the server 103, for example. The radio communication interface 2205 is, for example, an example of the aforementioned radio communication unit 703.

The moving device 704 may include a device such as a motor for driving a propeller of a drone, a motor for driving wheels of a vehicle, or a steering device for changing a traveling direction and enables the mobile relay device 700 to move in accordance with an instruction from the processor 2201.

The programs according to the embodiments may be installed in the storage units 212 and the storage unit 702, downloaded from the server, and distributed to the abnormality notifying devices 210 and the mobile relay device 700.

The hardware configurations that are described with reference to FIGS. 20, 21, and 22 and enable the abnormality notifying devices 210, the relay devices 101, and the mobile relay device 700 are examples, and the embodiments are not limited to this. For example, some or all of the functions may be implemented as hardware such as an FPGA or an SoC. FPGA is an abbreviation of field programmable gate array. SoC is an abbreviation of system-on-a-chip.

The embodiments are described above. The embodiments, however, are not limited to the aforementioned embodiments. It will be understood that the embodiments include various modified examples and alternative examples. For example, it will be understood that in the embodiments, the constituent elements may be modified and embodied without departing from the spirit and scope of the embodiments. In addition, it will be understood that various embodiments may be implemented by combining a plurality of constituent elements among the constituent elements disclosed in the embodiments. Furthermore, it will be understood by a person skilled in the art that various embodiments may be implemented by removing or replacing some constituent elements among the constituent elements disclosed in the embodiments or adding some constituent elements to the constituent elements disclosed in the embodiments.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An abnormality notification system comprising:
   a plurality of relay apparatuses, a plurality of abnormality notifying apparatuses each being attached to each of the plurality of relay apparatuses, and a mobile relay apparatus,
   each of the plurality of relay apparatuses including:
      a first memory; and
      a first processor coupled to the first memory and configured to form a first ad-hoc network and communicate with other relay apparatuses for relaying data received from a communication device; and
   each of the plurality of abnormality notifying apparatuses including:
      a second memory, and
      a second processor coupled to the second memory and configured to:
         form a second ad-hoc network, separate from the first ad-hoc network, with an abnormality notifying apparatus attached to another relay apparatus among the plurality of relay apparatuses, notify, when detecting an abnormality of a relay apparatus to which the abnormality notifying apparatus is attached, an abnormality notification indicating the abnormality via the second ad-hoc network to an abnormality notifying apparatus attached to another relay apparatus among the plurality of relay apparatuses, transmit, when receiving the abnormality notification transmitted by another abnormality notifying apparatus, the abnormality notification including a source set to an identifier of the abnormality notifying apparatus and a previous source set to an identifier of the other abnormality notifying apparatus, determine, when receiving the abnormality notification including the transfer flag indicating that the abnormality notification has been transferred to the mobile relay apparatus, whether the previous source set of the received abnormality notification indicates the abnormality notifying apparatus, continue, when the previous source set of the received abnormality notification indicates the abnormality notifying apparatus, to transmit the abnormality notification with setting the transfer flag to a value indicating that the abnormality notification has been transferred to the mobile relay apparatus, and stop, when the previous source set of the received abnormality notification does not indicate the abnormality notifying apparatus, the transmission of the abnormality notification after an elapse of a predetermined time period with setting the transfer flag of the abnormality notification to a value indicating that the abnormality notification has not been transferred to the mobile relay apparatus, the mobile relay apparatus including:
a third memory, and
a third processor coupled to the third memory and configured to:
guide the mobile relay apparatus to, when receiving the abnormality notification, the abnormality notifying apparatus identified by the identifier in the source set of the abnormality notification based on an intensity of a radio wave indicating the abnormality notification; and scan the abnormality notification transmitted by the abnormality notifying apparatus identified by the identifier in the previous source set of the abnormality notification, the abnormality notification further includes a transfer flag indicating whether the abnormality notification has been transferred to the mobile relay apparatus.

2. The abnormality notification system according to claim 1, wherein the third processor is further configured to:
accept a connection from a communication apparatus, when the mobile relay apparatus approaches the abnormality notifying apparatus attached to the relay apparatus from which the abnormality has been detected so that the intensity of the radio wave indicating the abnormality notification from the abnormality notifying apparatus attached to the relay apparatus from which the abnormality has been detected reaches an intensity equal to or higher than a predetermined intensity, instead of the relay apparatus from which the abnormality has been detected, and start collecting information from the communication apparatus.

3. An abnormality notification method in a system comprising a plurality of relay apparatuses and abnormality notifying apparatuses, the method including:

forming a first ad-hoc network among the plurality of relay apparatuses and allowing to communicate with each other for relaying data received from a communication device;

forming a second ad-hoc network, separate from the first ad-hoc network, among the abnormality notifying apparatuses, each being attached to each of the plurality of relay apparatuses;

when an abnormality notifying apparatus detects an abnormality of a relay apparatus to which the abnormality notifying apparatus is attached, the abnormality notifying apparatus notifies an abnormality notification indicating the abnormality via the second ad-hoc network to an abnormality notifying apparatus attached to another relay apparatus among the plurality of relay apparatuses, transmitting, when receiving the abnormality notification transmitted by another abnormality notifying apparatus, the abnormality notification including a source set to an identifier of the abnormality notifying apparatus and a previous source set to an identifier of the other abnormality notifying apparatus, determining, when receiving the abnormality notification including the transfer flag indicating that the abnormality notification has been transferred to the mobile relay apparatus, whether the previous source set of the received abnormality notification indicates the abnormality notifying apparatus, continuing, when the previous source set of the received abnormality notification indicates the abnormality notifying apparatus, to transmit the abnormality notification with setting the transfer flag to a value indicating that the abnormality notification has been transferred to the mobile relay apparatus, and stopping, when the previous source set of the received abnormality notification does not indicate the abnormality notifying apparatus, the transmission of the abnormality notification after an elapse of a predetermined time period with setting the transfer flag of the abnormality notification to a value indicating that the abnormality notification has not been transferred to the mobile relay apparatus, guiding the mobile relay apparatus to, when receiving the abnormality notification, the abnormality notifying apparatus identified by the identifier in the source set of the abnormality notification based on an intensity of a radio wave indicating the abnormality notification; and scanning the abnormality notification transmitted by the abnormality notifying apparatus identified by the identifier in the previous source set of the abnormality notification, the abnormality notification further includes a transfer flag indicating whether the abnormality notification has been transferred to the mobile relay apparatus.

4. An abnormality notification apparatus to be attached to a relay apparatus that forms a first ad-hoc network and communicate with other relay apparatuses for relaying data received from a communication device; the abnormality notification apparatus comprising:
a memory, and
a processor coupled to the memory and configured to, when attached to the relay apparatus:
form a second ad-hoc network, separate from the first ad-hoc network, with another abnormality notifying apparatus attached to another relay apparatus, and
notify, when detecting an abnormality of the relay apparatus to which the abnormality notifying apparatus is attached, an abnormality notification indicating the abnormality via the second ad-hoc network to the other abnormality notifying apparatus attached to the other relay apparatus,
transmit, when receiving the abnormality notification transmitted by another abnormality notifying apparatus, the abnormality notification including a source set to an identifier of the abnormality notifying apparatus and a previous source set to an identifier of the other abnormality notifying apparatus,
determine, when receiving the abnormality notification including the transfer flag indicating that the abnormality notification has been transferred to the mobile relay apparatus, whether the previous source set of the received abnormality notification indicates the abnormality notifying apparatus,
continue, when the previous source set of the received abnormality notification indicates the abnormality notifying apparatus, to transmit the abnormality notification with setting the transfer flag to a value indicating that the abnormality notification has been transferred to the mobile relay apparatus, and
stop, when the previous source set of the received abnormality notification does not indicate the abnormality notifying apparatus, the transmission of the abnormality notification after an elapse of a predetermined time period with setting the transfer flag of the abnormality notification to a value indicating that the abnormality notification has not been transferred to the mobile relay apparatus,
guide the mobile relay apparatus to, when receiving the abnormality notification, the abnormality notifying apparatus identified by the identifier in the source set of the abnormality notification based on an intensity of a radio wave indicating the abnormality notification; and
scan the abnormality notification transmitted by the abnormality notifying apparatus identified by the identifier in the previous source set of the abnormality notification,
the abnormality notification further includes a transfer flag indicating whether the abnormality notification has been transferred to the mobile relay apparatus.

5. The abnormality notification apparatus according to claim 4, wherein the third processor is further configured to
accept a connection from a communication apparatus, when the mobile relay apparatus approaches the abnormality notifying apparatus attached to the relay apparatus from which the abnormality has been detected so that the intensity of the radio wave indicating the abnormality notification from the abnormality notifying apparatus attached to the relay apparatus from which the abnormality has been detected reaches an intensity equal to or higher than a predetermined intensity, instead of the relay apparatus from which the abnormality has been detected, and
start collecting information from the communication apparatus.

6. The abnormality notification method according to claim 3, wherein the third processor is further configured to:
accept a connection from a communication apparatus, when the mobile relay apparatus approaches the abnormality notifying apparatus attached to the relay apparatus from which the abnormality has been detected so that the intensity of the radio wave indicating the abnormality notification from the abnormality notifying apparatus attached to the relay apparatus from which the abnormality has been detected reaches an intensity equal to or higher than a predetermined intensity, instead of the relay apparatus from which the abnormality has been detected, and start collecting information from the communication apparatus.

\* \* \* \* \*